(12) United States Patent
Yemini et al.

(10) Patent No.: US 11,093,269 B1
(45) Date of Patent: Aug. 17, 2021

(54) MANAGING RESOURCES IN VIRTUALIZATION SYSTEMS

(71) Applicant: TURBONOMIC, INC., Boston, MA (US)

(72) Inventors: Yechiam Yemini, Alpine, NJ (US); Shmuel Kliger, Chappaqua, NY (US); Danilo Florissi, Briarcliff Manor, NY (US); Shai Benjamin, Mevaseret Zion (IL); Yuri Rabover, San Carlos, CA (US); Mor Cohen, New York, NY (US); Enlin Xu, New York, NY (US); Endre Sara, Briarcliff Manor, NY (US)

(73) Assignee: Turbonomic, Inc., Boston, MA (US)

( * ) Notice: Subject to any disclaimer, the term of this patent is extended or adjusted under 35 U.S.C. 154(b) by 456 days.

(21) Appl. No.: 15/353,992

(22) Filed: Nov. 17, 2016

Related U.S. Application Data

(60) Division of application No. 14/539,973, filed on Nov. 12, 2014, now Pat. No. 9,852,011, which is a
(Continued)

(51) Int. Cl.
*G06F 9/455* (2018.01)
*G06Q 10/06* (2012.01)

(52) U.S. Cl.
CPC ...... *G06F 9/45558* (2013.01); *G06F 9/45545* (2013.01); *G06Q 10/0631* (2013.01);
(Continued)

(58) Field of Classification Search
CPC ............ G06F 9/45558; G06F 9/45545; G06F 2009/45595; G06F 2009/45579;
(Continued)

(56) References Cited

U.S. PATENT DOCUMENTS 6,055,571 A 4/2000 Fulp et al.
6,480,861 B1 11/2002 Kanevsky et al.
(Continued)

FOREIGN PATENT DOCUMENTS

| WO | WO 2005/106659 A1 | * | 11/2005 | ............ G06F 9/455 |
|---|---|---|---|---|
| WO | WO 2009/091580 A1 | | 7/2009 | |
| WO | WO 2010/036731 A2 | | 4/2010 | |

OTHER PUBLICATIONS

U.S. Appl. No. 09/589,501, filed Jun. 7, 2000, Yemini et al.
(Continued)

*Primary Examiner* — Patrice L Winder
(74) *Attorney, Agent, or Firm* — Morgan, Lewis & Bockius LLP

(57) ABSTRACT

Methods, systems, and apparatus, including computer program products, for managing resources in virtualization systems, including multi-cloud systems. The use of supply chain economics alone and in combination with other techniques offers a unified platform to integrate, optimize or improve, and automate resource management in a virtualization system. These techniques may be used to monitor and control the delivery of service level agreements and software licenses. They may also be used to monitor and control contention of computing resources in a virtualization system, and to suspend or terminate computing resources.

12 Claims, 10 Drawing Sheets

Related U.S. Application Data continuation-in-part of application No. 12/492,890, filed on Jun. 26, 2009, now Pat. No. 8,914,511.

(60) Provisional application No. 62/077,898, filed on Nov. 10, 2014, provisional application No. 62/077,852, filed on Nov. 10, 2014, provisional application No. 62/077,860, filed on Nov. 10, 2014.

(52) U.S. Cl.
 CPC ............. *G06F 2009/45579* (2013.01); *G06F 2009/45595* (2013.01)

(58) Field of Classification Search
 CPC ..... G06Q 10/0631; H04L 41/50; H04L 43/08; H04L 47/2425; H04L 41/5003–5019; H04L 41/5009; H04L 41/5019; H04L 41/5025; H04L 43/0852; H04L 43/0858; H04L 43/0864; H04L 43/0876; H04L 43/0882; H04L 43/0888; H04L 43/0894; H04L 47/76; H04L 47/762; H04L 47/765
 See application file for complete search history.

(56) References Cited

U.S. PATENT DOCUMENTS

| Patent No. | | Date | Inventor | CPC |
|---|---|---|---|---|
| 6,735,553 | B1 | 5/2004 | Frogner et al. | |
| 7,013,296 | B1 | 3/2006 | Yemeini et al. | |
| 7,140,039 | B1 | 11/2006 | Yemini et al. | |
| 7,272,855 | B1 | 9/2007 | Yemeni et al. | |
| 7,441,023 | B2 | 10/2008 | Benjamin et al. | |
| 7,464,132 | B1 | 12/2008 | Florissi et al. | |
| 7,496,655 | B2 | 2/2009 | Gopalan et al. | |
| 7,590,601 | B2 | 9/2009 | Shea et al. | |
| 7,685,270 | B1 | 3/2010 | Vermeulen et al. | |
| 7,711,789 | B1 | 5/2010 | Jnagal et al. | |
| 7,774,457 | B1 | 8/2010 | Talwar et al. | |
| 7,840,517 | B2 | 11/2010 | Morimura et al. | |
| 7,856,549 | B2* | 12/2010 | Wheeler | G06F 1/3203 713/1 |
| 7,865,762 | B2* | 1/2011 | Swanson | G06F 11/0712 714/2 |
| 7,877,754 | B2 | 1/2011 | Birkestrand et al. | |
| 7,904,540 | B2* | 3/2011 | Hadad | G06F 9/4856 709/223 |
| 8,019,861 | B2* | 9/2011 | Ginzton | G06F 9/4856 709/223 |
| 8,051,017 | B2 | 11/2011 | Munson et al. | |
| 8,060,875 | B1 | 11/2011 | Lambeth | |
| 8,095,929 | B1* | 1/2012 | Ji | G06F 9/4856 709/223 |
| 8,099,615 | B2* | 1/2012 | Tripathi | G06F 9/4818 713/324 |
| 8,161,475 | B2* | 4/2012 | Araujo, Jr. | G06F 9/455 709/224 |
| 8,181,175 | B1 | 5/2012 | McKee et al. | |
| 8,209,409 | B2* | 6/2012 | Mopur | G06F 11/008 709/223 |
| 8,230,069 | B2* | 7/2012 | Korupolu | H04L 67/1097 709/226 |
| 8,271,345 | B1 | 9/2012 | Milgrom et al. | |
| 8,286,174 | B1 | 10/2012 | Schmidt et al. | |
| 8,346,933 | B2* | 1/2013 | Kawato | G06F 9/455 709/222 |
| 8,347,302 | B1 | 1/2013 | Vincent et al. | |
| 8,347,307 | B2* | 1/2013 | Dawson | G06F 9/5077 718/104 |
| 8,352,608 | B1* | 1/2013 | Keagy | G06F 8/63 709/226 |
| 8,370,898 | B1 | 2/2013 | Jackson | |
| 8,396,807 | B1 | 3/2013 | Yemini et al. | |
| 8,407,518 | B2* | 3/2013 | Nelson | G06F 11/203 714/13 |
| 8,429,097 | B1 | 4/2013 | Sivasubramanian et al. | |
| 8,433,801 | B1 | 4/2013 | Yemini et al. | |
| 8,478,878 | B2 | 7/2013 | Freimuth et al. | |
| 8,650,296 | B1 | 2/2014 | Herington et al. | |
| 8,661,131 | B1 | 2/2014 | Yemini et al. | |
| 8,762,531 | B1 | 6/2014 | Yemini et al. | |
| 8,782,233 | B2* | 7/2014 | Ferris | G06F 9/5072 709/225 |
| 8,782,235 | B2* | 7/2014 | Nishiguchi | G06F 9/5077 709/226 |
| 8,789,043 | B2* | 7/2014 | Biran | G06F 9/5066 718/1 |
| 8,909,783 | B2* | 12/2014 | Ferris | G06F 9/45533 709/226 |
| 8,914,511 | B1 | 12/2014 | Yemini et al. | |
| 8,959,249 | B1 | 2/2015 | Love | |
| 9,596,239 | B2* | 3/2017 | Edwards | G06F 9/45533 |
| 9,769,085 | B2* | 9/2017 | Laribi | H04L 12/6418 |
| 9,929,931 | B2* | 3/2018 | Breitgand | G06F 9/45558 |
| 2002/0147611 | A1 | 10/2002 | Greene et al. | |
| 2003/0154123 | A1 | 8/2003 | Subbloie et al. | |
| 2005/0005271 | A1 | 1/2005 | Clymer et al. | |
| 2005/0132363 | A1 | 6/2005 | Tewari et al. | |
| 2005/0256683 | A1 | 11/2005 | Hillermeier | |
| 2006/0020939 | A1 | 1/2006 | Fellenstein et al. | |
| 2006/0045100 | A1 | 3/2006 | Klausberger et al. | |
| 2006/0090163 | A1 | 4/2006 | Karisson et al. | |
| 2006/0143617 | A1 | 6/2006 | Knauerhase et al. | |
| 2006/0167984 | A1 | 7/2006 | Fellenstein et al. | |
| 2006/0168584 | A1 | 7/2006 | Dawson et al. | |
| 2006/0184937 | A1 | 8/2006 | Abels et al. | |
| 2006/0188011 | A1 | 8/2006 | Goldszmidt et al. | |
| 2006/0190482 | A1 | 8/2006 | Kishan et al. | |
| 2006/0212332 | A1 | 9/2006 | Jackson | |
| 2006/0244607 | A1 | 11/2006 | Liu et al. | |
| 2006/0265470 | A1 | 11/2006 | Rolia et al. | |
| 2007/0105630 | A1 | 5/2007 | Van Luchene | |
| 2007/0204266 | A1* | 8/2007 | Beaty | G06F 9/45558 718/1 |
| 2008/0052387 | A1 | 2/2008 | Heinz et al. | |
| 2008/0080552 | A1 | 4/2008 | Gates et al. | |
| 2008/0083031 | A1 | 4/2008 | Meijer et al. | |
| 2008/0104608 | A1 | 5/2008 | Hyser et al. | |
| 2008/0109241 | A1 | 5/2008 | D'Alto et al. | |
| 2008/0127348 | A1 | 5/2008 | Largman et al. | |
| 2008/0154837 | A1 | 6/2008 | Morimura et al. | |
| 2008/0155169 | A1 | 6/2008 | Hiltgen et al. | |
| 2008/0163194 | A1 | 7/2008 | Dias et al. | |
| 2008/0201409 | A1 | 8/2008 | Vul et al. | |
| 2008/0244607 | A1 | 10/2008 | Rysin et al. | |
| 2008/0250143 | A1 | 10/2008 | Garg et al. | |
| 2008/0301027 | A1 | 12/2008 | Boss et al. | |
| 2008/0319926 | A1 | 12/2008 | Alam et al. | |
| 2008/0320474 | A1 | 12/2008 | Jelinek et al. | |
| 2009/0007126 | A1 | 1/2009 | Jelinek et al. | |
| 2009/0052333 | A1 | 2/2009 | Vankov et al. | |
| 2009/0089406 | A1 | 4/2009 | Roush et al. | |
| 2009/0164356 | A1 | 6/2009 | Bakman | |
| 2009/0172666 | A1 | 7/2009 | Yahalom et al. | |
| 2009/0182565 | A1 | 7/2009 | Erickson et al. | |
| 2009/0240628 | A1 | 9/2009 | Blair et al. | |
| 2009/0249488 | A1 | 10/2009 | Robinson et al. | |
| 2009/0276271 | A1 | 11/2009 | Munson et al. | |
| 2009/0276771 | A1 | 11/2009 | Nickolov et al. | |
| 2010/0005173 | A1 | 1/2010 | Baskaran et al. | |
| 2010/0057625 | A1 | 3/2010 | Boss et al. | |
| 2010/0077449 | A1 | 3/2010 | Kwok et al. | |
| 2010/0088205 | A1 | 4/2010 | Robertson | |
| 2010/0106820 | A1 | 4/2010 | Gulati et al. | |
| 2010/0142522 | A1 | 6/2010 | Gardner | |
| 2010/0153945 | A1 | 6/2010 | Bansal et al. | |
| 2010/0180275 | A1 | 7/2010 | Neogi et al. | |
| 2010/0318454 | A1 | 12/2010 | Warncke et al. | |
| 2010/0319004 | A1 | 12/2010 | Hudson et al. | |
| 2011/0131335 | A1 | 6/2011 | Spaltro et al. | |
| 2011/0225277 | A1 | 9/2011 | Freimuth et al. | |
| 2011/0276951 | A1 | 11/2011 | Jain | |
| 2012/0072762 | A1 | 3/2012 | Atchison et al. | |
| 2012/0131591 | A1 | 5/2012 | Moorthi et al. | |

(56) References Cited

U.S. PATENT DOCUMENTS

| | | |
|---|---|---|
| 2012/0226796 A1 | 9/2012 | Morgan |
| 2012/0317578 A1 | 12/2012 | Kansal et al. |
| 2014/0081766 A1 | 3/2014 | Maass |
| 2014/0229608 A1* | 8/2014 | Bauer .................. H04L 41/142 709/224 |
| 2014/0376368 A1 | 12/2014 | Xiao et al. |
| 2014/0380324 A1 | 12/2014 | Xiao et al. |

OTHER PUBLICATIONS

U.S. Appl. No. 09/589,495, filed Jun. 7, 2000, Yemini et al.
"Apahce Hadoop NextGen MapReduce (YARN)", The Apache Software Foundation, Nov. 2014, 2 pages. http://hadoop.apache.org/docs/current/hadoop-yarn/hadoop-yarn-site/YARN.html.
"Big Ideas: Demystifying Hadoop", EMC, YouTube Video, Published Jul. 2012. https://www.youtube.com/watch?v=xJHv5t8jcM8.
"Kubernetes Design Overview", GitHub, GoogleCloudPlatform, Oct. 2014, 4 pages. https://github.com/GoogleCloudPlatform/kubernetes/blob/master/DESIGN.md.
"MapReduce Tutorial", The Apache Software Foundation, Nov. 2014, 25 pages. http://hadoop.apache.org/docs/current/hadoop-mapreduce-client/hadoop-maproduce-client-core/MapReduceTutorial.html.
Byde et al., "Market-Based Resource Allocation for Utility Data Centers", HP Laboratories Bristol, Sep. 2003, 16 pages.
Dailianas et al., "MarketNet: Market-based Protection of Network Systems and Services—an Application to SNMP Protection", INFOCOM 2000, Nineteenth Annual Joint Conference of the IEEE Computer and Communications Societies, IEEE, vol. 3, Mar. 2000, 10 pages.
Dailianas, "Use of Currency for Access Control in Large-scale Information Systems", Ph.D. Thesis Proposal, Columbia University, Department of Computer Science, Sep. 1998, 33 pages.
Dias et al., "Online Traffic-aware Virtual Machine Placement in Data Center Networks", Global Information Infrastructure and Networking Symposium (GHS), 2012, 8 pages.
Erickson et al., "Using Network Knowledge to Improve Workload Performance in Virtualized Data Centers", PhD thesis, Stanford University, May 2013, 10 pages.
Ferguson et al., "Economic Models for Allocating Resources in Computer Systems", Market Based Control of Distributed Systems. World Scientific, 2006, 26 pages.
Ferguson et al., "Microeconomic Algorithms for Load Balancing in Distributed Computer Systems", IBM T.J. Watson Research Center, Nov. 2008, 9 pages.
Gao et al., Economics-Inspired Decentralized Control Approach for Adaptive Grid Services and Applications, International Journal of Intelligent Systems, vol. 21, 2006, 20 pages.
Huberman et al., "Distributed Computation as an Economic System", Journal of Economic Perspectives, vol. 9, No. 1, 1995, 12 pages.
Meng et al., "Improving the Scalability of Data Center Networks with Traffic-aware Virtual Machine Placement", INFOCOM, 2010 Proceedings IEEE, Mar. 2010, 9 pages.
Sandholm, "Managing Service Levels in Grid Computing Systems: Quota Policy and Computation; Computational Market Approaches", KTH Computer Science and Communication, Licentiate Thesis, Stockholm, Sweden, 2007, 105 pages.
Sarangan et al., "Comparative Study of Protocols for Dynamic Service Negotiation in the Next-Generation Internet", IEEE Communications Magazine, vol. 44, No. 3, Mar. 2006, 6 pages.
Stonebraker et al., "An Economic Paradigm for Query Processing and Data Migration in Mariposa", IEEE Xplore, 1994, 10 pages.
Sutherland, "A Futures Market in Computer Time", Aiken Computation Lab, vol. 11, No. 6, Jun. 1968, 3 pages.
Turner et al., "A Lightweight Currency Paradigm for the P2P Resource Market", Electronic Commerce Research—ECR, 2003, 15 pages.
Waldspurger et al., "Spawn: A Distributed Computational Economy", IEEE Transactions on Software Engineering, vol. 18, No. 2, Feb. 1992, 15 pages.
Wang et al., "Pricing Network Resources for Adaptive Applications", IEEE/ACM Transactions on Networking, vol. 14, No. 3, Jun. 2006, 14 pages.
Yemini et al., "MarketNet: Market-Based Protection of Information Systems", ICE '98 Proceedings of the first international conference on Information and computation economics, 1998, 12 pages.
Yemini et al., "MarketNet: A Market-Based Architecture for Survivable Large-Scale Information Systems", Columbia University, Department of Computer Science, Aug. 2002, 6 pages.
Yemini et al., "MarketNet: A Survivable, Market-Based Architecture for Large-Scale Information Systems", Final Technical Report, Air Force Research Laboratory, Aug. 2002, 27 pages.
Yemini et al., "MarketNet: Protecting Access to Information Systems Through Financial Market Controls", Decision Support Systems—Special Issue on Information and Computational Economics, vol. 28, No. 1-2, Mar. 2000, 20 pages.
Yemini et al., "MarketNet: Using Virtual Currency to Protect Information Systems", Research and Advanced Technology for Digital Libraries, Second European Conference, ECDL '98, 1998, 12 pages.
Yuksel et al., "Effect of Pricing Intervals on Congestion-Sensitivity of Network Prices", Telecommunication Systems, vol. 28, No. 1, 2005, 21 pages.

* cited by examiner

| Source-ID 802 | Provider-ID 804 | Transaction-ID 806 | Service 808 | Payment 810 | Authentication 812 |

| Source-ID 852 | Provider-ID 854 | Transaction-ID 856 | Service Confirmation 858 | Authentication 860 |

MANAGING RESOURCES IN VIRTUALIZATION SYSTEMS

RELATED APPLICATIONS

This Application is a divisional (and claims the benefit) of U.S. patent application Ser. No. 14/539,973, which was filed on Nov. 12, 2014, which is a continuation-in-part of U.S. patent application Ser. No. 12/492,890, filed on Jun. 26, 2009, the entire disclosures of which are incorporated herein by reference in their entirety for all purposes. Additionally, this Application is related to U.S. patent application Ser. No. 12/540,259 (now U.S. Pat. No. 8,661,131), Ser. No. 12/540,273 (now U.S. Pat. No. 8,762,531), Ser. No. 12/540,293 (now U.S. Pat. No. 8,396,807), and Ser. No. 12/540,298 (now U.S. Pat. No. 8,433,801), each filed on Aug. 12, 2009, and each entitled "Managing Resources in Virtualization Systems," the entire disclosures of which are incorporated herein by reference in their entireties and for all purposes. This application also claims the benefit of U.S. Provisional Patent Application Nos. 62/077,898, filed Nov. 10, 2014, entitled "Managing Resources in Container Systems;" 62/077,852, filed Nov. 10, 2014, entitled "Managing Resources in Virtualization Systems;" and 62/077,860, filed Nov. 10, 2014, entitled "Managing Application Performance in Virtualization Systems," the entire disclosures of each Provisional Application which are also incorporated herein by reference in their entireties and for all purposes.

BACKGROUND

This specification relates to virtualization systems, and particularly to managing resources in such systems.

Traditional computer system architectures typically include one or more dedicated computer servers for each application being run, and are often designed to include an excessive allocation of resources in order to be able to handle peak demands. Such partitioning of computer systems through dedicated servers and excessive allocation of resources can be costly, inefficient and difficult to scale and manage.

Virtualization, which refers to the abstraction of computer resources from their hardware or software-based physical constructs, is one manner of dealing with the aforementioned problems. A virtualization system includes one or more virtual machines (VMs), each of which is a software implementation of a computer that executes programs or applications as if it was a physical computer. A virtual machine operates like a physical computer and contains, for example, its own virtual (e.g., software-based) central processing unit (CPU), random access memory (RAM), hard disk storage and network interface card (NIC). Each virtual machine in a virtualization system generally runs its own guest operating system (OS), and the virtual machines generally share the underlying physical machine resources of the system.

There are many potential benefits to operating in a virtualization system versus traditional architectures. For example, by permitting the sharing of hardware among applications workloads, virtualization can be used for improving resource utilization and reducing the need for excess resources to absorb peak traffic. Virtualization can also be used to improve the availability and robustness of applications, by shifting workloads among servers to handle fail-over situations. Notwithstanding the potential benefits, operating in a virtualization system presents several challenges and potential pitfalls, including significant operations management challenges.

SUMMARY

This specification describes technologies relating to the management of resources in virtualization systems, including multi-cloud systems. These technologies introduce the use of supply chain economics and other techniques to offer a unified platform to integrate, optimize or improve, and automate resource management in a virtualization system.

In general, one aspect of the subject matter described in this specification can be embodied in methods that include the actions of determining, by a virtual machine element manager running on a data processor in a virtualization system, a computer resource bundle to be purchased for the virtual machine using virtual currency units; identifying multiple computer servers in the virtualization system offering the computer resource bundle; determining a purchase price for the computer resource bundle, in virtual currency units, for each of the identified computer servers; automatically selecting, by the virtual machine element manager, one of the identified computer servers based at least in part on the purchase price for the computer resource bundle set for each of the identified computer servers; and allocating the computer resource bundle from the selected one of the multiple computer servers to the virtual machine. Other embodiments of this aspect include corresponding systems, apparatus, and computer program products.

Another aspect of the subject matter described in this specification can be embodied in methods that include the actions of determining, by an element manager running on a data processor in a first virtualization system, a computer resource bundle to be purchased for a computer element in the first virtualization system using virtual currency units; receiving, from a proxy manager of a second virtualization system offering the computer resource bundle, a purchase price for the computer resource bundle in virtual currency units; automatically purchasing the computer resource bundle from the second virtualization system based at least in part on the purchase price received from the proxy manager of the second virtualization system; and allocating the computer resource bundle from the second virtualization system to the computer element in the first virtualization system. Other embodiments of this aspect include corresponding systems, apparatus, and computer program products.

A further aspect of the subject matter described in this specification can be embodied in methods that include the actions of determining, by an element manager running on a data processor in a first virtualization system, a computer resource bundle to be purchased for a computer element in the first virtualization system using virtual currency units; identifying at least a second virtualization system and a third virtualization system offering the computer resource bundle at respective purchase prices, in virtual currency units; receiving, from respective proxy managers of the second virtualization system and the third virtualization system, a first purchase price for the computer resource bundle for the second virtualization system and a second purchase price for the computer resource bundle for the third virtualization system; automatically selecting one of the second virtualization system and the third virtualization system based at least in part on the respective purchase prices for the computer resource bundle for the second virtualization system and the third virtualization system; and allocating the computer resource bundle from the selected one of the second virtualization system and the third virtualization system to the computer element in the first virtualization system. Other embodiments of this aspect include corresponding systems, apparatus, and computer program products.

Still another aspect of the subject matter described in this specification can be embodied in methods that include the actions of allocating a computer resource bundle to an application operating in a virtualization system; determining, by an application element manager running on a data processor in the virtualization system, the value of a service level agreement parameter for the application based on the allocated computer resource bundle; comparing the determined service level agreement parameter level for the application to a threshold service level agreement parameter level; automatically modifying the allocation of computer resources to the application depending on whether the identified service level agreement parameter level for the application is below or above the threshold service level agreement parameter level; and repeating the determining, comparing and automatically modifying steps until the operation of the application in the virtualization system is suspended or terminated. Other embodiments of this aspect include corresponding systems, apparatus, and computer program products.

Yet another aspect of the subject matter described in this specification can be embodied in methods that include the actions of purchasing a computer resource bundle, using virtual currency units, for an application running on a virtual machine in a virtualization system; allocating the purchased computer resource bundle to the application; determining, by an element manager running on a data processor in the virtualization system, the value of a service level agreement parameter for the application; automatically modifying the purchase of the computer resource bundle based at least in part on a comparison of the determined value of a service level agreement parameter to a predetermined threshold service level agreement parameter level; and repeating the determining, comparing and automatically modifying steps until the operation of the application in the virtualization system is suspended or terminated. Other embodiments of this aspect include corresponding systems, apparatus, and computer program products.

Another aspect of the subject matter described in this specification can be embodied in methods that include the actions of determining, by a virtual machine element manager running on a data processor in a virtualization system, an amount of input/output (I/O) bandwidth to be acquired for the virtual machine; identifying at least a first computer server and a second computer server in the virtualization system each offering at least the determined amount of I/O bandwidth; allocating, from the first computer server, the amount of I/O bandwidth to the virtual machine; determining the I/O bandwidth utilization of the first computer server; automatically allocating the amount of I/O bandwidth to the virtual machine, from the second computer server, based at least in part on the determined I/O bandwidth utilization of the first computer server. Other embodiments of this aspect include corresponding systems, apparatus, and computer program products.

Yet another aspect of the subject matter described in this specification can be embodied in methods that include the actions of determining, by a virtual machine element manager running on a data processor in a virtualization system, an amount of I/O bandwidth to be acquired from a first computer server for the virtual machine, wherein the virtual machine in running on the first computer server; allocating, from the first computer server, the amount of I/O bandwidth to the virtual machine for a first period of time; after the first period of time has elapsed, determining that the I/O bandwidth utilization of the first computer server is greater than a threshold limit; automatically identifying at least a second computer server in the virtualization system offering at least the determined amount of storage I/O bandwidth in response to the determined I/O bandwidth utilization of the first computer server; moving the virtual machine from the first computer server to the identified second computer server; and allocating, from the second computer server, the amount of storage I/O bandwidth to the virtual machine for a second period of time. Other embodiments of this aspect include corresponding systems, apparatus, and computer program products.

Still another aspect of the subject matter described in this specification can be embodied in methods that include the actions of determining, by an application element manager running on a data processor in a virtualization system, a software license to be purchased using virtual currency units by an application operating in a virtualization system; determining, by a licensing element manager running on a data processor in a virtualization system, the number of copies of the software licenses available for purchase in the virtualization system; determining, by the licensing element manager, the purchase price for a copy of the software license; automatically purchasing, by the application element manager, a copy of the software license for the application based at least in part of the determined purchase price for a copy of the software license; and allocating the purchased copy of the software license to the application. Other embodiments of this aspect include corresponding systems, apparatus, and computer program products.

A further aspect of the subject matter described in this specification can be embodied in methods that include the actions of allocating, from a computer server in the virtualization system, a computer resource bundle to a virtual machine operating in the virtualization system; determining, by a virtual machine element manager running on a data processor in the virtualization system, a productivity score of the virtual machine; determining that the productivity level of the virtual machine is below a threshold productivity level; and automatically initiating, by the virtual machine element manager, at least one of a suspension sequence and a termination sequence for the virtual machine based at least in part on the determination that the productivity level of the virtual machine is below a threshold level. Other embodiments of this aspect include corresponding systems, apparatus, and computer program products.

Another aspect of the subject matter described in this specification can be embodied in methods that include the actions of allocating a computer resource bundle to a computer server operating in the virtualization system; determining, by a computer server element manager running on a data processor in the virtualization system, a productivity score of the computer server; determining that the productivity level of the computer server is below a threshold productivity level; and automatically initiating, by the computer server element manager, at least one of a suspension sequence and a termination sequence for the computer server based at least in part on the determination that the productivity level of the computer server is below a threshold level. Other embodiments of this aspect include corresponding systems, apparatus, and computer program products.

These and other embodiments can optionally include one or more of the following features. Virtual currency units are used to control the purchase of computer resources. Computer resources are allocated only if a budget of the acquiring computer element is sufficient. The allocation of computer resources is in exchange for the payment of virtual currency units. Virtual currency units are converted into real currency, such as United Stated dollars, or euros. A performance metric of an application executing on a virtual machine is determined, and the allocation of computer resources is based on such performance metric. A performance metric of an application executing on a virtual machine is determined, and the allocation of virtual currency units to the application or the virtual machine is based on such performance metric. The computer resources to be allocated include at least one of an allotment of computer memory, an allotment of program execution scheduling for one or more central processing units, an allotment of storage interface bandwidth, an allotment of network interface bandwidth, and an allotment of a storage array. A computer resource provider is selected based on the price offered for the computer resources. The price offered for the computer resources is determined by an auction process. The amount of computer resources purchased is dependent on a computed computer resource utilization. A proxy manager of a second virtualization computer system controls the allocation of computer resources to a first virtualization computer system. These features are optional and not exhaustive, and they may be separately realized or realized in various combinations.

Moreover, particular embodiments of the subject matter described in this specification can be implemented to realize one or more of the following advantages. Computing resources may be monitored and managed in virtualization systems based on economic and non-economic principles, both in single-cloud and multi-cloud systems. Such management of resources may be used to control the delivery of service level agreements, and the distribution of software licenses, in virtualization systems. They may also be used to suspend or terminate computing resources in virtualization systems. These advantages and features are optional and not exhaustive, and they may be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8A is an example purchase order data structure for use in purchasing services from a provider element manager in a virtualization system.

FIG. 8B is an example service confirmation data structure for use in confirming or rejecting the purchase of services from a provider element manager in a virtualization system.

Like reference numbers and designations in the various drawings indicate like elements.

DETAILED DESCRIPTION

Figure 1:
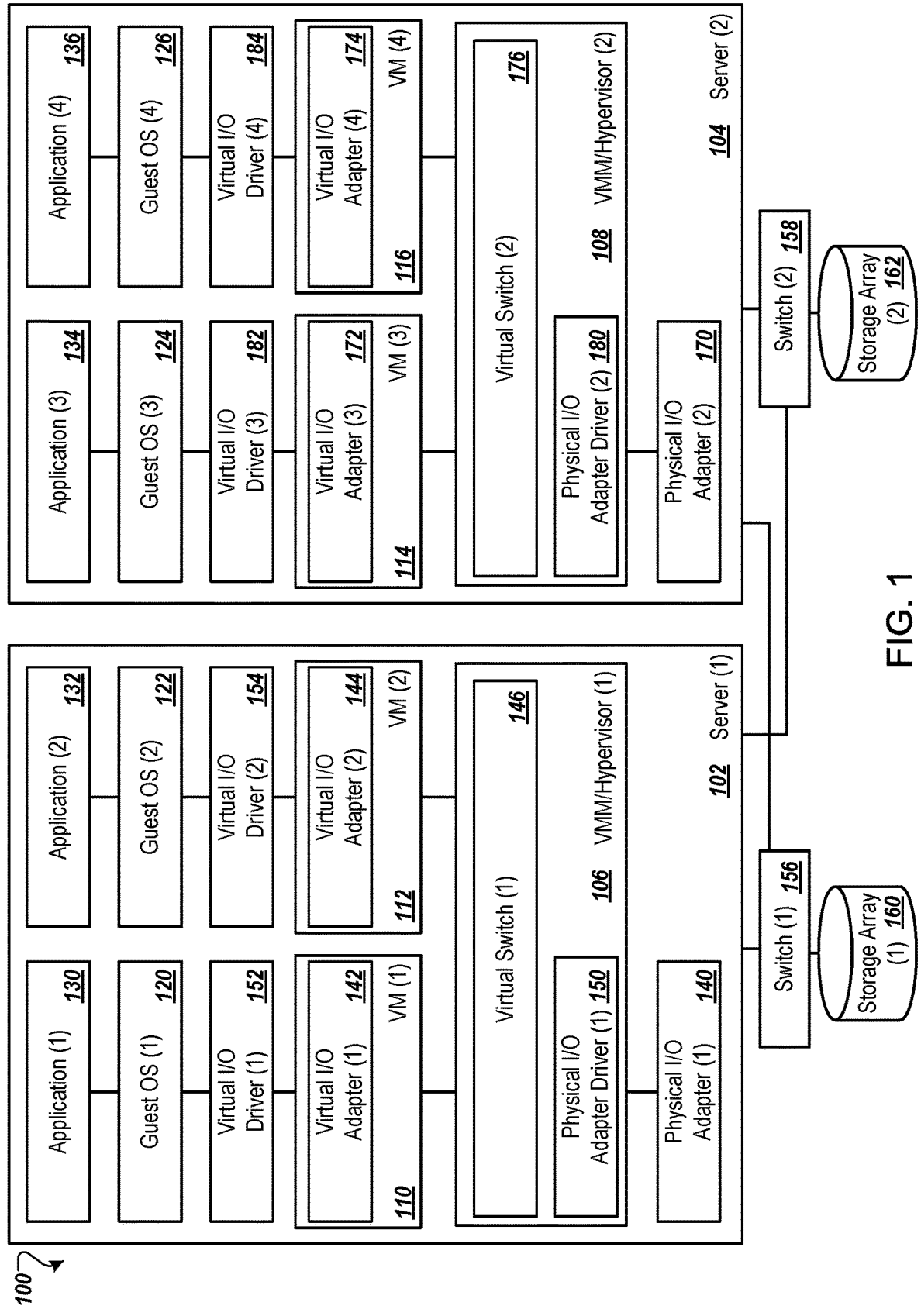
FIG. 1 is a block diagram of an example virtualization environment in which resources are managed.

FIG. 1 is a block diagram of an example virtualization environment 100 in which resources are managed. The example environment 100 including two physical servers 102 and 104 that are virtualized, resulting in multiple logical servers. The virtualization of the resources of the servers 102 and 104 is provided by respective virtual machine monitors, or hypervisors 106 and 108. As used herein, the term "hypervisor" refers to virtualization software that allows multiple operating systems to run on a single host computer concurrently. There are multiple types of hypervisors that may be used according to various embodiments, including native hypervisors, which are software systems that run directly on the host server's hardware as a hardware control and guest operating system monitor. Thus, with native hypervisors, the guest operating system runs on another level above the hypervisor. Native hypervisors are also commonly referred to as "bare-metal" or "Type 1" hypervisors. Another type of hypervisor includes hosted hypervisors, which are software applications running within a conventional operating system environment. With hosted hypervisors, considering the hypervisor layer as being a distinct software layer, the guest operating system runs at the third level above the hardware. Hosted hypervisors are also commonly referred to as "Type 2" hypervisors.

In the example embodiment shown in FIG. 1, the hypervisor 106 at the server 102 serves as an intermediary software layer and allocates this server's resources between a first virtual machine 110 and a second virtual machine 112. For example, the hypervisor 106 schedules the CPUs and memory of the server 102 to process the virtual machines 110 and 112. Similarly, the hypervisor 108 at the server 104 allocates this server's resources between its first virtual machine 114 and its second virtual machine 116.

Virtual machines 110, 112, 114, and 116 may be distinct virtual machines or replicated copies of a single virtual machine. In other embodiments, virtual machines 110, 112, 114, and 116 may be components associated with a composite virtual machine or cluster of related virtual machines, also referred to as a virtual point of delivery ("POD"), or vPOD, of virtual machines. For example, virtual machines 110, 112, 114, and 116 may be components of a multi-tier web service.

As also shown in FIG. 1, the virtual machines 110, 112, 114 and 116 run the respective guest operating systems 120, 122, 124 and 126. For example, these operating systems may include one or more instances of Mac OS, Microsoft Windows, Linux, BSD or Solaris. The guest operating systems 120, 122, 124 and 126 execute respective applications 130, 132, 134 and 136. Applications 130, 132, 134, and 136 may be distinct applications. For example, the application 130 may be a human resources (HR) application, the application 132 may be a sales application, the application 134 may be a customer relationships management (CRM) application, and the application 136 may be a marketing application.

Alternatively, as described above with respect to virtual machines 110, 112, 114, and 116, applications 130, 132, 134, and 136 may be replicated copies of a single application, such as a sales application. In other embodiments, applications 130, 132, 134, and 136 may be components associated with a composite application or cluster of related applications, also referred to as a vPOD of applications. In one embodiment, the vPOD includes a cluster of interacting applications software (e.g., applications 130, 132, 134, and 136) running over respective virtual machines (e.g., the virtual machines 110, 112, 114 and 116, respectively).

For example, applications 130, 132, 134, and 136 may be components of a multi-tier web service, each application representing a virtual server (e.g., web server, application server, database server, and so on) of the multi-tier web service. Stated in another way, vPODs cluster the software resources (compared to hardware clustering of physical and network resources) to allow for the aggregation of virtual computing capacity. Software resources that can be clustered include, without limitation, virtual machines, file systems, database system application servers, software appliances, and so on. vPods advantageously simplify allocation of compute resources (for example, to applications 130, 132, 134, and 136), support network services, and can be used to help assure performance metrics (e.g., latency, throughput, and so on). vPods provide similar scalability and simplification/unification of operations management to hardware clustering.

Accordingly, vPODs provide a simplified model for scalable organization of large services. The services may be provided by vPODs—for example, using common templates—to provide dynamic scale-out. In one example, a management system can automatically replicate vPODs, deploy each vPOD into a hardware cluster, and allocate vPOD workloads (e.g., based on resource pricing, virtual currency, and so on, discussed below) during service peak time. The principles described herein may be applied regardless of the particular application or applications being run in the virtualization system.

The hypervisors 106 and 108 are also used in allocating storage and network input/output (I/O) pathways to their respective virtual machines 110, 112 and 114, 116. For example, considering first the server 102, the hypervisor 106 of the server 102 may virtualize a physical I/O adapter 140 into multiple virtual I/O adapters 142 and 144, which may then be respectively assigned to the virtual machines 110 and 112 and may act as proxy emulators of the physical adapter 140. For example, the physical I/O adapter 140 may be a Fiber Channel (FC) or Internet SCSI protocol (iSCSI) Host Bus Adapter (HBA), whereas the virtual I/O adapters 142 and 144 may be virtual HBAs. Alternatively, for example, the physical I/O adapter 140 may be an InfiniBand host channel adapter (HCA) or an Ethernet NIC, whereas the virtual adapters 142 and 144 may be virtual HCAs or NICs, respectively. The virtual I/O adapters 142 and 144 are enabled with the same set of resources, such as network or logical unit number (LUN) addressing, as are available in the physical adapter 140.

To enable communication between the virtual machines 110 and 112 and the steering of traffic between the physical adapter 140 and the virtual I/O adapters 142 and 144, the hypervisor 106 may implement a shared-memory software switch, or virtual switch 146. In some software implementations of hypervisor 106, the virtual switch 146 also acts as a layer upon which some or all virtual infrastructure management functions may be implemented.

The hypervisor 106 shown in FIG. 1 may also virtualize a physical I/O adapter driver 150 into multiple virtual I/O adapter drivers 152 and 154. The virtual drivers 152 and 154 direct the respective I/O flows to and from the virtual I/O adapter 142 and 144, respectively, which forward the traffic to and from the physical adapter 140. The physical I/O adapter 140 forwards traffic through the external network switch 156 or 158 to and from the respective storage array 160 or 162.

Similarly, with respect to the second server 104, hypervisor 108 may virtualize a physical I/O adapter 170 into multiple virtual I/O adapters 172 and 174, which may be respectively assigned to the virtual machines 114 and 116. The hypervisor 108 implements a virtual switch 176, and also virtualizes a physical I/O adapter driver 180 into multiple virtual I/O adapter drivers 182 and 184. The physical I/O adapter 170 forwards traffic through the external network switch 156 or 158 to and from the respective storage array 160 or 162.

The aforementioned I/O pathways may be used to enable virtual machine access to various types of external storage and networks. For example, the switch 156 may be used for connecting the virtual machines 110, 112, 114 and 116 to a storage area network (SAN), in which case the physical I/O adapter 140 or 170 would be an HBA and switch 156 would be a SAN switch. SANs provide block-level access to a storage array (such as storage array 160) using a storage access protocol, such as FC or iSCSI as mentioned above. Additionally, for example, the switch 158 may be a used for connecting the virtual machines 110, 112, 114 and 116 through a local area network (LAN) to Network Attached Storage (NAS), which provides file-level access over the LAN using a file server protocol such as the Network File Serve (NFS) protocol, or the Common Internet File Server (CIFS) protocol. In that case, the physical I/O adapter 140 or 170 would be a NIC and switch 158 would be a LAN switch.

According to various embodiments, one or both of switch 156 and 158 can be used to interconnect virtual machines. For example, switch 158 can be a LAN switch that interconnects the virtual machines 110 and 114 via an input/output (I/O) pathway that includes virtual switches 146, 176, physical I/O adapters (e.g., Ethernet NICs) 140 and 170, and respective I/O adapter drivers 150 and 180. Such I/O pathways may support application-to-application packets flows. The supported flows can include one or more of TCP/IP flows between two or more applications (e.g., applications 130 and 134), application-to-storage packet flows (e.g., application 130 to storage array 162), and storage-to-storage packet flows (e.g., between storage arrays 160 and 162). These and other flows and be implemented using, for example, Fiber Channel Over Ethernet (FCOE).

The various I/O pathways described above can provide, and be designed to conform to, different capacity, latency, priority, availability, loss, and other types of service-level agreement (SLA) characteristics. For example, I/O pathways between two virtual machines sharing a server, e.g., virtual machines 110 and 112, typically use the server memory to handle I/O communications efficiently; e.g., the virtual machines 110 and 112 read and write I/O data using a shared memory; I/O exchanges can thus be handled at memory access bandwidth and incur negligible latency. These memory-based I/O pathways typically offer higher bandwidth and lower latency than I/O pathways between two virtual machines placed or residing at distinct or separate servers, e.g., servers 102 and 104. This results, for example, because I/O pathways involving multiple servers typically traverse physical switches and adapters that include lower capacity and higher latency.

Although a specific environment 100 including the two servers 102 and 104 is shown in FIG. 1 and described above, it will be understood that this environment 100 is illustrative only. For example, although FIG. 1 shows only one application for each of the virtual machines 110, 112, 114 and 116, it is possible for any of these virtual machines to be running more than one application. Additionally, for example, the environment 100 may include more than two servers, and each of the servers 102 and 104 may be associated with more or less than two virtual machines as shown.

Figure 2:
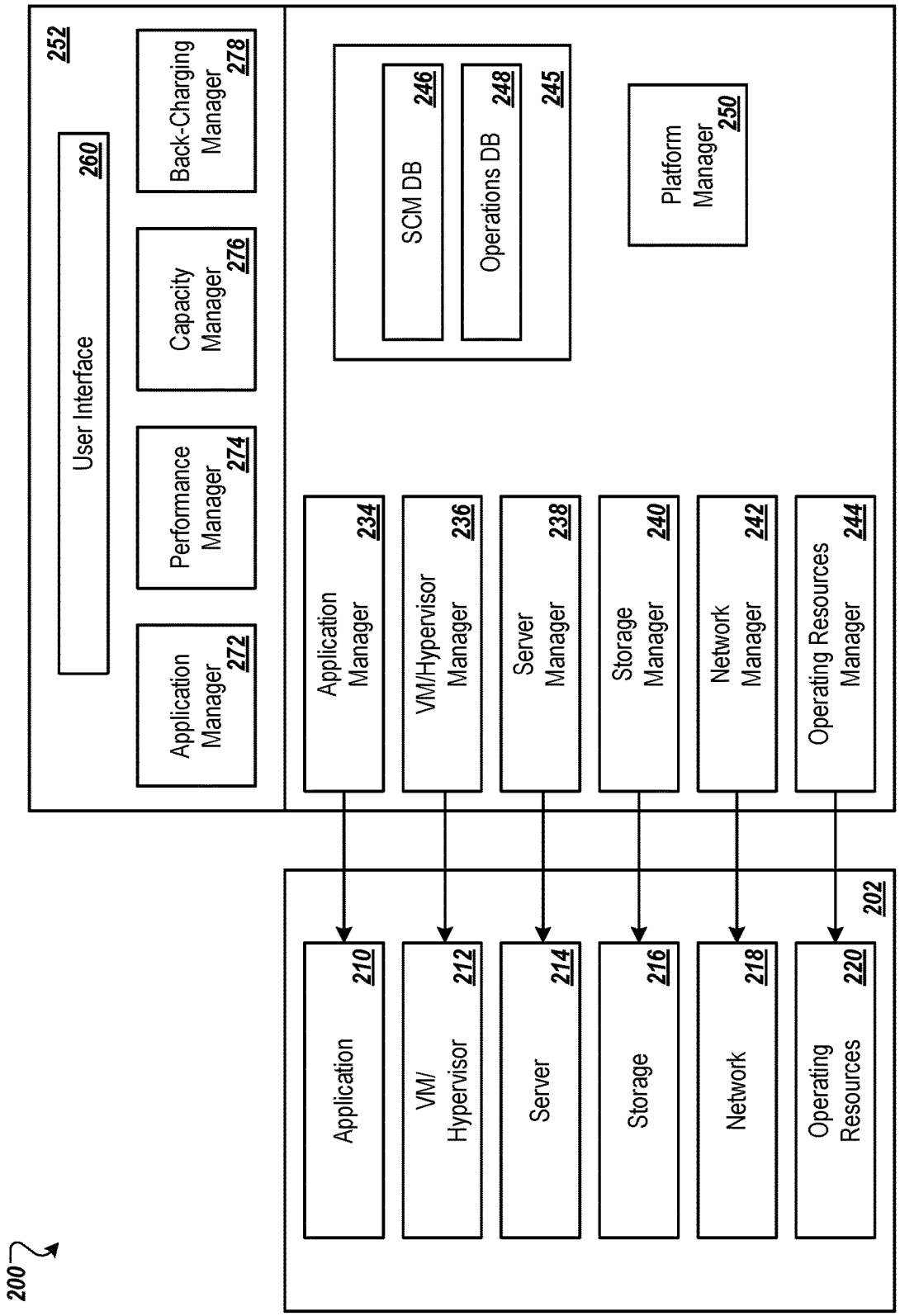
FIG. 2 is a block diagram of an example software system for managing resources in a virtualization system.

FIG. 2 is a block diagram of an example software system 200 for managing resources in virtualization systems. The software system 200 may be used to allocate server and I/O resources (such as CPU, memory and I/O bandwidth) to virtual machines. The software system 200 may also be used, for example, to monitor, detect and handle congestion conditions along I/O pathways, and to move virtual machines among available servers to optimize or improve application performance and utilization.

The software system 200 monitors, controls and otherwise interacts with various managed virtualization system elements (also referred to herein as service elements or computer elements) through respective instrumentation. It will be understood that, as used herein in the context of computers, the term "instrumentation" refers generally to any software and/or hardware that provides an ability to monitor, control or otherwise interact with a computer element, such as to diagnose errors and write trace information. For example, when a computer application contains instrumentation code, it may be managed using a management tool.

Several example virtualization system elements are shown in FIG. 2 as part of Information Technology (IT) Virtualization Stack (ITVS) 202, including applications components 210, virtual machines and hypervisors 212, servers 214, storage systems 216, networks 218 and operating resources 220 (such as power supplies, cooling systems and space). In some embodiments, the ITVS 202 may include, for example, a proper subset or a proper superset of these virtualization system elements 210, 212, 214, 216, 218 and 220.

As shown, the software system 200 includes a platform layer 230, which provides an infrastructure to manage, for example, the I/O flows in a virtualization system (such as the example virtualization environment 100 shown in FIG. 1). The platform layer 230 includes element managers 234, 236, 238, 240, 242 and 244. More particularly, the platform layer 230 includes an application manager 234, a virtual machine and hypervisor manager 236, a server manager 238, a storage manager 240, a network manager 242, and an operations manager 244. These element managers 234, 236, 238, 240, 242 and 244 use management instrumentation of respective elements to monitor and control the respective elements of ITVS 202. For example, the server manager 238 may use built-in management instrumentation, such as Management Information Bases (MIBs) of the server it is managing, to monitor the server's CPU, memory and I/O interfaces (such as HBAs and NICs), and to control their operational parameters. The server manager 238 may access such management instrumentation using standardized protocols (such as Simple Network Management Protocol (SNMP)), or specialized mechanisms. In some embodiments, a proper superset or only a proper subset of these element managers 234, 236, 238, 240, 242 and 244 may be desired or needed in certain environments. For example, when each virtual machine in a virtualization system is dedicated to a single application, the use of an application manager 234 may not be desired or needed. Additionally, for example, an operating system element manager (not shown) may be included as part of platform layer 230.

As also shown, the platform layer 230 also includes one or more types of modeling databases. As discussed in more detail below, these databases may include supply chain modeling (SCM) databases 246 and operations databases 248 as described below. The platform layer 230 also includes a platform manager 250, which as explained in greater detail below, is responsible for general provisioning, initializing and management tasks.

The software system 200 shown in FIG. 2 also includes a functional management layer 252, which includes user interface (UI) software 260 for use by administrators or other users to monitor and control a virtualization system (such as the example virtualization environment 100 shown in FIG. 1). For example, an administrator may use UI software 260 to set proactive automation policies to optimize or improve performance and resource utilization, detect and resolve operational problems and performance bottlenecks, allocate priorities and usage charges to different applications, and plan capacity expansions.

The functional management layer 252 also includes a collection of functional managers 272, 274, 276 and 278, which are used to enable users to monitor, control and automate the underlying automated management mechanisms of virtualization systems according to the principles described herein. The software system 200 may alternatively include, for example, a proper subset or a proper superset of these functional managers.

As shown in FIG. 2, the functional management layer 252 includes an applications manager 272, which, for example, enables users to select or configure respective parameters in connection with which a computer agent or process partitions applications components among different virtual machines, allocates virtual budgets to applications based on the business value of their services, as described in greater detail below, and specifies the resources required by applications. The application manager 272 uses these user-selected parameters to create respective records in the operational databases 248. The platform manager 250 uses these operational records to initialize respective application element managers 234, which use these records to deploy the applications 210, according to the principles described below. Additional functions of monitoring and controlling applications may be incorporated into the applications manager 272.

The performance manager 274 is used by users to monitor and control the delivery of Service Level Agreements (SLAs) to applications. For example, a user of the software system 200 can specify target SLA parameters, such as latency or transaction rate, of one or more particular applications. These specifications are used by the software system 200 to tune the performance of the applications using the principles described below. A user can also monitor the SLA parameters value, as well as the respective virtual payments made by an application, thereby correlating the application's budget with its SLA performance. Additional functions of monitoring and controlling the performance of applications, as well as the other elements of the ITVS 202, may be incorporated into the performance manager 274.

The capacity manager 276 monitors relationships between the supply and demand of resources in the ITVS 202. For example, the capacity manager 276 may monitor such relationships over periods of time that may range from short term (such as a few minutes or one hour) to long term (such as one day, week, month or year). The capacity manager 276 may maintain full accounting of revenues and costs and provide monitoring of these accounts and notifications upon certain accounting events. The capacity manager, by itself or with the assistance of an incorporated or separate Return-on-Investment (ROI) manager, enables a user to monitor the ROI of the elements in the ITVS 202. ROI is defined as revenues divided by costs, where revenue is the income from virtual payment collected by the element and cost is the virtual payments by the element for the resources it uses. For example, a large ROI may indicate to the capacity manager 276 that there is excess demand over supply of the element capacity, and sustained high ROI may thus indicate insufficient capacity. The capacity manager 276 may compare a monitored ROI with specific and potentially predetermined ROI targets, which may be configured by an administrator or other user, to recommend capacity increases of particular elements to meet demand. According to the supply chain economic principles described below, the ROI of an element in the ITVS 202 may be considered as a central metric of economic value.

ROI may be calculated at any appropriate time and for any appropriate duration over which revenue and cost are considered. Thus, the principles described herein provide an accounting framework to quantify and measure the value generated by components of the ITVS 202. For example, at the bottom of the ITVS 202, there are raw resources that generate real (non-virtual) costs, such as monetary costs that are paid to an electric company. At the top of the ITVS 202, there are applications that play roles in generating real (non-virtual) revenues, such as monetary sales revenue received from customers. It is possible to treat one or more of the system elements 210, 212, 214, 216, 218 and 220 as virtual P&L (Profit and Loss) entities, generating revenues through payments by its consumers, and paying the costs of services it consumes. Through the use of virtual currency pricing and payments as described herein to distribute a share of these revenues to cover costs, it is possible to increase efficiency and overall ROI of the entire system.

The back-charging manager 278 monitors and accounts for the virtual cash flows between elements in the ITVS 202 and enables users to flexibly compute financial metrics of interest. For example, users can monitor metrics describing the allocation of applications budgets to acquire supply chain resources, the allocation of a resource among the workloads of different applications, the ROI efficiency of different resources, and application budgets required to deliver particular SLAs. These and other parameters may be used to support policies on budgeting applications, tuning the budgets to represent changing prices, capacity and demand of resources along the supply chain, and converting virtual currency used within the software system 200 to real currency (such as United States dollars, or euros) that is generated by the business units who own the applications and that may be used to pay for IT resources.

Figure 3:
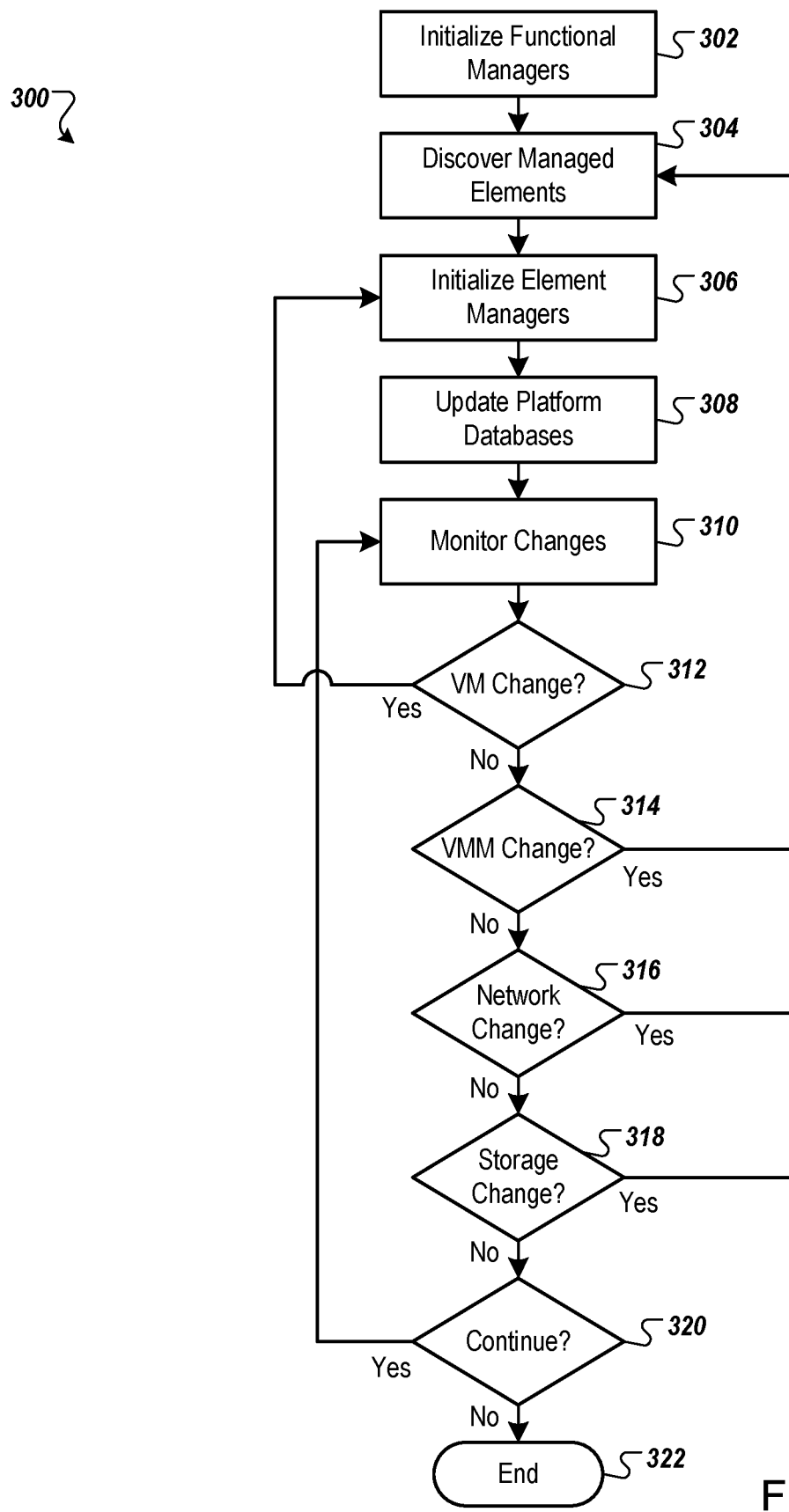
FIG. 3 is a flow diagram of an example process for using a platform manager in a virtualization system.

FIG. 3 is a flow diagram of an example process 300 for using the above-described platform manager 250 in a virtualization system. The platform manager 250 initializes, or launches, the functional managers 272, 274, 276 and 278 of functional management layer 252 to be used by a specific virtualization environment (302). The platform manager 250 discovers the managed virtualization system elements of the ITVS 202 in the virtualization environment (304). This discovery is generally handled through standard processes to get configuration data from the existing hypervisors, network and storage equipment.

The platform manager 250 also initializes, or launches, an element manager (such as one or more of element managers 234, 236, 238, 240, 242 and 244 described above) for each group of respective elements of a given class of elements that have been discovered (306). For example, the discovery may detect a Dell server and a SUN server, and the corresponding groups of respective elements may both be assigned respective element managers. The platform manager 250 configures the element managers to monitor and control the respective elements via respective management instrumentation.

The platform manager 250 populates and initializes the platform modeling databases 245, including supply chain modeling databases 246 and operational databases 248 (308), and starts monitoring certain potential changes of the managed environment (310). For example, the presence of virtual machines is evaluated to determine if there have been any virtual machine changes, such as any added, deleted or migrated virtual machines (312). If a virtual machine change has been detected, the platform manager 250 again initializes the element managers as described above.

If no virtual machine changes have been detected, the presence of hypervisors is evaluated to determine if there have been any hypervisor changes, such as any added or deleted hypervisors (314). If a hypervisor change has been detected, the platform manager 250 again discovers the managed virtualization system elements of the ITVS 202 in the virtualization environment as described above. Otherwise, the platform manager 250 evaluates whether there have been any major network changes (316), in which case the platform manager 250 similarly re-discovers the managed virtualization system elements of the ITVS 202 in the virtualization environment as described above. For example, the platform manager 250 may discover loss or gain of network I/O pathways, congestion or under-utilization of an I/O pathway, low or excessive latency of an I/O pathway, or packet losses along an I/O pathway. Otherwise, the platform manager 250 evaluates whether there have been any major storage changes (318). For example, the platform manager 250 may discover storage I/O congestion, or alternate I/O pathways that would provide better (i.e., lower) access latency. If major storage changes have been detected, the platform manager 250 again discovers the managed virtualization system elements of the ITVS 202 in the virtualization environment as described above.

If no virtual machine, hypervisor, network or storage changes have been detected, the platform manager 250 determines whether to continue monitoring of the same (320). If it decides to continue monitoring, the platform manager 250 again starts the monitoring of potential changes of the managed environment. Otherwise, the process 300 ends (322).

The order of steps in the example process 300 described above is illustrative only, and can be done in different orders. For example, the platform manager 250 may evaluate whether there have been any major storage changes (318) before determining whether there has been any major network changes (316). Moreover, additional steps may be included, for example, to protect the software system 200 against its own failures. Such additional steps may include, for example, inserting between steps 308 and 310 described above the steps (not shown) of creating a mirror and backup copies of the platform image (including databases 246 and 248), running a second instance of the software system 200 in standby mode and monitoring the primary instance of the software system 200, and switching to the standby instance of the software system 200 upon detecting the failure of the first instance of the software system 200.

Figure 4:
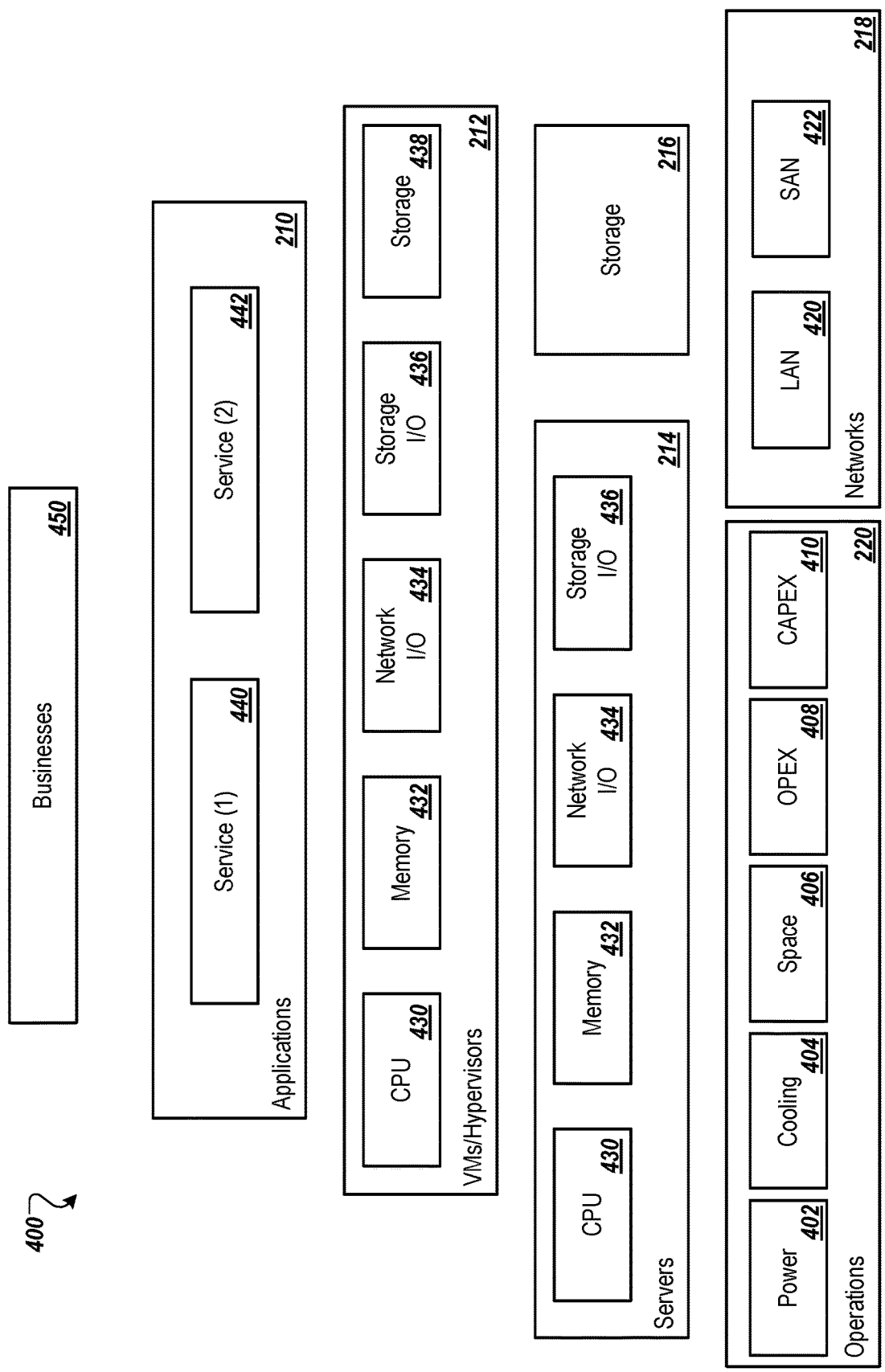
FIG. 4 is an example model for service provision and consumption in a supply chain virtualization system.

According to various embodiments, the software system 200 described above operates using a supply chain software model of the ITVS 202 that it manages. In other words, each virtualization system element of the ITVS 202 is modeled as a provider and a consumer of services. For example, FIG. 4 is an example model 400 for service provision and consumption in a supply chain virtualization environment. As shown in FIG. 4, which includes references to the virtualization system elements of the ITVS 202 shown in FIG. 2, the server 214 may consume services of the operating resources 220, including power 402, cooling 404, physical space 406, a share of capital expenditure (CAPEX) costs 408 and a share of operating expenditure (OPEX) costs 410, as well as the resources of networks 218, including LAN 420 and SAN 422. The server 214, however, may provide the virtual machines and hypervisors 212 with various physical resource services, including CPU bandwidth 430, memory 432, network I/O bandwidth 434 and storage I/O bandwidth 436. As also shown, the virtual machines and hypervisors 212 may also consume storage resources 438 from the storage element 216, and in turn, may offer services (such as services 440 and 442) to the application 210. The application 210, on the other hand, may offer services to respective business activities of one or more business units 450.

According to various embodiments, the allocation of resources and the processing of workloads through the supply chain, as described above, including but not limited to vPOD configurations, may be performed through the use of virtual currency. In these cases, supply chain elements use virtual currency to pay for the services they consume and to price the services they offer. For example, an application 210 may receive a budget from its business users reflecting the business value of the services that it offers. The application 210 may shop for a virtual machine 212 that offers the lowest priced processing services it requires, and may use its virtual budget to pay for these services. The virtual machine 212, in turn, may use its income of virtual currency to pay for the services offered by the server 214 and the storage system 216. Each of the virtualization systems elements of the ITVS 202 may price their services in virtual currency to reflect their costs, and additionally, or in the alternative, to balance supply and demand.

According to various embodiments, resource pricing may also be based on one or both of capacity and performance characteristics. For example, the server 214 may offer multiple types of processors or CPUs, with respective clock rates and other characteristics, at different prices. Similarly, for example, storage I/O resources in a storage system 216 and network I/O resources in a network 218 may be priced according to their bandwidth and latency characteristics. This manner of pricing can take into account that, as noted above, I/O pathways internal to a server (i.e., interconnections of virtual machines co-located with a single server, e.g., virtual machines 110 and 112 as shown in FIG. 1) typically offer higher bandwidth and lower latency than I/O pathways between virtual machines located at different and distinct servers (e.g., virtual machines 110 and 114 as shown in FIG. 1). Thus, for example, one or more of the components and resources associated with internal I/O pathways (or the aggregate of such components and resources) may be priced lower than components and resources (alone or in the aggregate) for pathways traversing switches and/or involving multiple servers. Alternatively, for example, components and resources associated with such internal I/O pathways may be priced higher to account for an expected increase in performance and thus value to the acquiring entity.

The supply chain model of the ITVS 202 is primarily maintained by the supply chain model databases 246 shown in FIG. 2. According to various embodiments, supply chain model databases 246 may include one or more financial databases to debit and credit the respective accounts of customers and providers to reflect the transfer of virtual payments, as discussed in greater detail below. It will be understood, however, that non-monetary transactions may be entered into between a consumer and a provider.

The supply chain model databases 246 may be object-relationship databases, such that elements of the supply chain are modeled as objects corresponding to services to be offered. As used herein, the term "objects" refers to data structures including data fields and methods. Two types of service objects maybe include simple and composite service objects.

According to various embodiments, simple service objects, or objects relating to the provision of a single type of service, may include the following types of attributes:

<service-identifier, units, used, available, duration, price( ).

The "service-identifier" attribute may itself include the following types of attributes as descriptors of the service that may be used for a particular class of services: <name, type, description, element manager>. For example, a CPU service provided by a Dell server with an Intel iQ9550 processor managed by element manager ServerEM015 may be assigned the following identifier: <Dell4, CPU, iQ9550, ServerEM015>.

The "units" attribute may measure the quantity of service, such as 5 Mhz (CPU), 2 GB (memory) or 10 Mbps (net I/O).

The "used" attribute may refer to the amount of the service or resource capacity that is already committed.

The "available" attribute may refer to the amount that remains to meet new demands.

The "duration" attribute may indicated the period of time over which service is to be rendered.

The "price(demand)" attribute may refer to a method whose input is the demand by a service consumer, for a number of service units it requires, which computes the price in virtual currency units, as set by the service provider. For example, the simple service object <<Dell4, CPU, iQ9550, ServerEM015>, 0.1 Ghz, 0.8 Ghz, 2 Ghz, 1 hr, price(x)>, where price(x)=$1/(2-0.1x)^2$, may be used to describe a CPU service named Dell4, providing an Intel processor of type Q9550 for one hour in units of 0.1 Ghz. In this case, a request for 0.5 Ghz (5 units) of this CPU service will be priced at price(5)=1/2.25=$0.44 per one hour of use.

According to various embodiments, the pricing functions used by simple service objects can be flexibly adapted by element managers to reflect different pricing goals and mechanisms. For example, a server may be shared by 4-20 virtual machines, which preferably utilize no more than 50% of its capacity to avoid congestion. In this case, the percentage of average demand to capacity of a given server resource preferably falls between 2.5%-12.5%.

Consider a commodity service, defined as one where this ratio is very small. With supply far exceeding demand, prices will drop to reflect costs. Thus, a commodity service may be priced at fixed cost-based price. For example, suppose the percentage of average demand to capacity for CPU usage by a virtual machines is 2%. In such a scenario, the shifting of a virtual machine among servers would have negligible impact on the quality of CPU services seen by the virtual machines. CPUs can therefore be priced at a fixed level to merely reflect the costs of providing CPUs. In general, a commodity service may be priced at a fixed level, independently of demand. However, when the ratio of average demand to capacity is sufficiently large, arriving demands may easily deplete the supply absent pricing control, thus requiring higher prices to balance the supply and demand.

A sample pricing function that provides such pricing control is:

$$price[x]=cost/(1-(U+x)/C)^4$$

where
C=capacity of the resource;
U=amount of resource used; and
x=new demand.

Such a pricing function is proportional to costs, penalizing high utilization. When the utilization u=(U+x)/C approaches its limit of one, prices increase rapidly, preventing all but the highest budget applications from accessing the resource. For example, suppose virtual machines require, on average, 2% of the CPU capacity of servers, but 20% of their storage I/O capacity. In this scenario, a virtual machine wanting to deploy with a server supporting three virtual machines will see the following CPU and storage I/O prices:

$$price_{CPU}[0.02C]=cost_{CPU}/(1-0.08C/C)^4=cost_{CPU}/0.92^4=1.4*cost_{CPU}$$

$$price_{I/O}[0.2C]=cost_{I/O}/(1-0.8C/C)^4=cost_{I/O}/0.2^4=625*cost_{I/O}.$$

Thus, in the above-described scenario, CPU is priced at a relatively small multiplier of the cost base of CPU, while the storage I/O is priced at a relatively large multiplier of the cost base of I/O. Although specific pricing considerations and mechanisms have been described, a large variety of pricing functions may be used according to other embodiments to best reflect specific use considerations.

Composite service objects, which are objects that include more than one service object and which relate to the provision of multiple types of services, may take the following form according to various embodiments:

<service-identifier, service-1, service-2 . . . , service-n>, where service-k is either a simple or composite service object and is referred to as a component of the composite service. In some embodiments, the "duration" attributes of all components of a composite service are identical, and their common value is called the duration of the composite service. For example, a hardware server may be described by the following composite service object:

<<server-1, Server, LS41>, CPU4, Memory-2, NIC-3, NIC-4, HBA-2> where Memory-2, NIC-3, NIC-4 and HBA-2 indicate respective simple service objects associated with respective memory services, LAN-interface services provided by two NICs, and SAN I/O services provided by HBA-2. The HBA-2 may itself be described by a simple service object as follows:

<<HBA-2, FC-HBA, Emulex, LP11000-M4>, 0.1 Gbps, 1.1 Gbps, 2.9 Gbps, 1 hr, price(x)>.

This service object indicates that the duration of the composite service is one hour, as the durations of all components of a composite service are identical.

In some embodiments, the price of a composite service is defined as the sum of the prices of all its components. For example, the price of a server object is the sum of the prices of the units of CPU, memory, network I/O and storage I/O required by a consumer.

The supply chain model databases 246 are maintained by element managers (such as element managers 234, 236, 238, 240, 242 and 244 shown in FIG. 2), which handle the service objects corresponding to the respective elements that they manage. As explained above with respect to the sample process 300 shown in FIG. 3, according to various embodiments, an element manager is initialized by the platform manager 250, and subsequently the element manager proceeds to populate the supply chain model databases 246 with respective service objects it is responsible for. Once the supply chain model databases 246 have been updated, the element manager continues to update the dynamic attributes of its respective service objects (such as the "used" and "available" attributes). For example, a server manager 238 that is responsible for managing HBA resources will initialize the supply chain model databases 246 with corresponding simple service objects relating to the HBA. The server manager 238 will then monitor and update the "used" and "available" attributes of this simple service object by periodically accessing the HBA instrumentation.

As mentioned above, the supply chain economy matches consumers and providers of resources or services by using pricing and budgeting. According to various embodiments, demand for services is matched to supply through a shopping model. A consumer element manager (such as one of element managers 234, 236, 238, 240, 242 and 244 shown in FIG. 2), desiring services from a provider element manager, queries the supply chain model databases 246 in search of the best priced provider or providers of the desired services. The query specifies requirements and the service or services the element manager is requesting. For example, a query may take the following form:

Query: Server, CPU.units=50 Mhz, Memory.units=4 GB, StorageIO.units=200 Mbps, NetworkIO.units=100 Mbps.

Such a query may retrieve records of composite service objects of the servers 214 offering the respective CPU, memory, storage I/O and network I/O capacity at the lowest price. Once the consumer element manager acquires these records of lowest-priced service objects, it can proceed to extract the identities of the element managers posting these service offerings. The consumer element manager may then pursue direct interactions and contract with one or more respective provider element managers to acquire and pay for the desired services. There exists the possibility that multiple consumers may query the supply chain model databases 246 simultaneously for similar services, and thus potentially interfere with each other's shopping processes. Such interference may be avoided, for example, by providing standard locking mechanisms to maintain atomicity of the query and purchase transactions.

Moreover, various embodiments may use an auction, or bidding model, rather than a shopping model, to match demand and supply. For example, consumer element managers may post respective bids for services in a bidding database, which a provider element manager may then query for the highest bid price offered for its services and contract to serve it. The shopping model is generally preferred to bidding in situations where consumers' demands arrive asynchronously and unpredictably. In such cases, an arriving consumer can find the low-cost provider by searching the supply chain model databases 246. In contrast, a bidding process requires providers to poll, whether constantly or at intervals, the bidding database to detect arrivals of new bids, while bidding consumers may be required to wait until enough providers have polled the bidding database and accepted the bids, and thus contract with providers based at least in part on chance. There are various situations where bidding may offer benefits over shopping, and those situations may be handled using the principles described herein.

Figure 5:
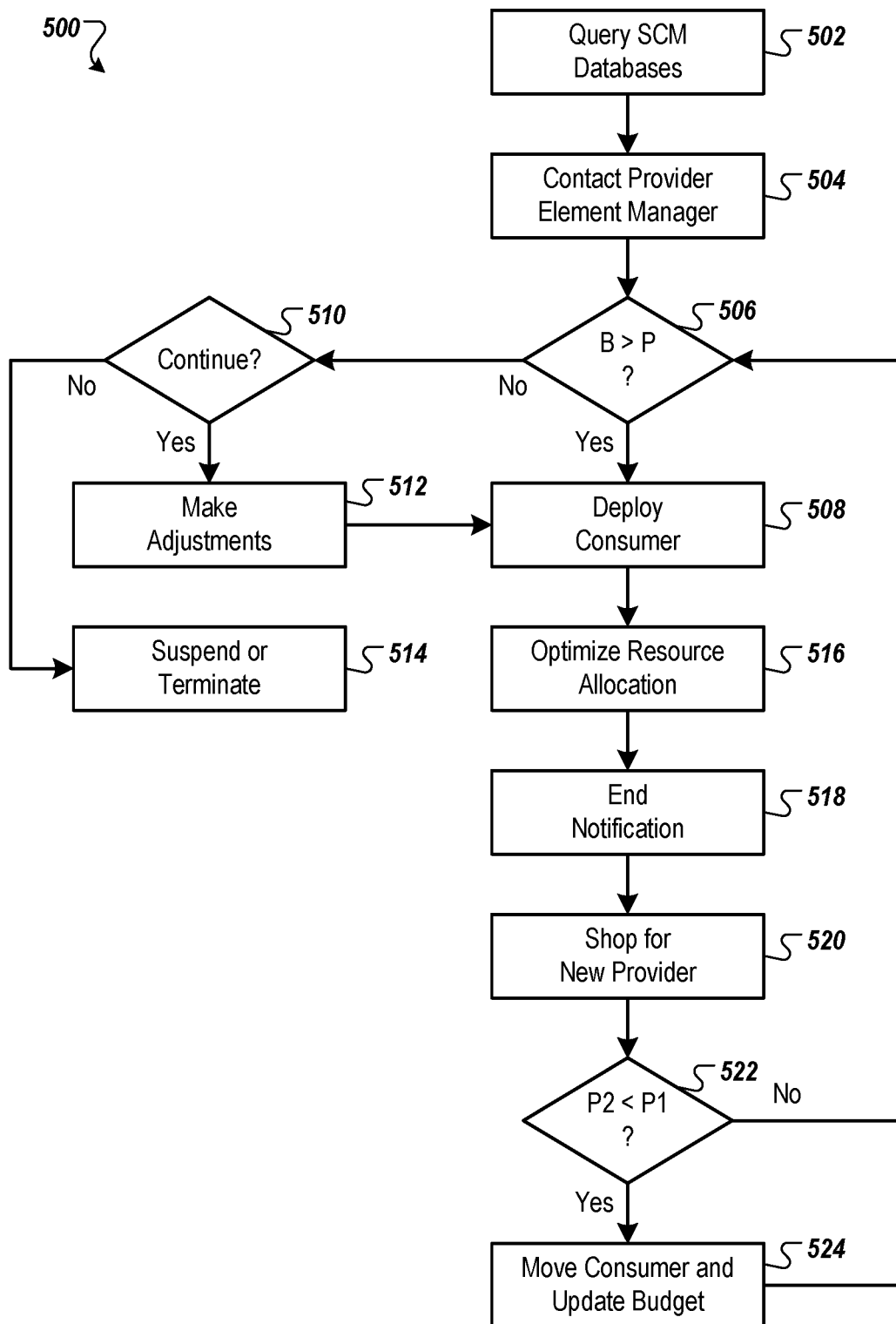
FIG. 5 is a flow diagram of an example process for deploying a new consumer element with a provider element in a virtualization system.

FIG. 5 is a flow diagram of an example process 500 for deploying a new consumer element (such as a virtual machine) with a provider element (such as a server) in a virtualization system that is used according to various embodiments for balancing the demand and supply of services. The dynamic load balancing approach illustrated by example process 500 provides an effective solution to several of the resource management problems described above. For example, process 500 may be used to improve the balancing of demands by virtual machines and the supply of server resources; it may also be used to balance the resource bundle allocated to a virtual machine, e.g., to match the amount of CPU, memory and storage I/O bandwidth allocated to the virtual machine, in order to improve the use of its virtual budget to best service its resource demands.

As shown in FIG. 5, once the relevant consumer element managers and provider element managers are running, having been initiated by the platform manager 250, a consumer element manager shops for lowest cost provider for a bundle of services by querying the supply chain model databases 246 as described above (502), and contacts the provider element manager to buy services (504). In the case of a virtual machine consumer, for example, the bundle of services to be purchased may include CPU, memory and storage I/O.

The provider element manager determines whether the consumer budget is sufficient to pay the price for the requested provider services (506). If it is determined that there is sufficient budget, the provider element manager deploys the consumer at the provider, which proceeds to process its workload (508). For example, CPU and memory resources that have been purchased may be allocated to a virtual machine by the underlying scheduler of the hypervisor, which may include the use of a traditional operating systems scheduling algorithm. The server element manager configures the scheduler parameters to accomplish fairly accurate allocation of the CPU and memory. Memory may be allocated by specifying an amount of memory to be provided. The hypervisor can allocate physical memory, based on these specifications, or support virtual memory mechanisms that permit over 100% utilization of physical memory. Additionally, the CPU may be allocated by configuring reservations and shares parameters of the scheduler. For example, reservations may be used to allocate a reserved CPU slice, using a time-shared round-robin scheduler, while shares allocate the remaining CPU bandwidth through a Weighted Fair Queuing scheduler. CPU reservations and shares may be viewed as separate services, and may be individually priced according to supply and demand. For example, a low-priority application may be unable to buy reservations, and may thus need to settle for shares, which may be priced lower. A high-priority, mission-critical application, on the other hand, may have sufficient budget to afford sufficient reservations to support its needs.

Otherwise, if it is determined that there is not sufficient budget, the consumer element manager initiates a credit check process to decide whether the consumer can increase its budget or sufficiently lower its service demands, and thus continue to run (510). For example, suppose the consumer is a virtual machine whose budget is short of paying the cost of a provider server. In that case, the virtual machine may use credit it has accumulated to pay for the service, obtain additional budget from the applications it serves, or reduce its demand for services and the corresponding price to the point where it can afford to pay. If one or more of these scenarios is possible, the consumer uses credit, increases its budget and/or lowers its service demands (512), and the provider element manager thus deploys the consumer at the provider as described above. Otherwise, if none of these options is available, the consumer is suspended and then will either terminate or re-launch when adequate budget becomes available to it (514), as described in greater detail below.

After the provider element manager deploys the consumer at the provider, the provider element manager or the consumer element manager monitors consumer resource usage and adjusts allocation of resources to optimize or improve the use of the consumer's budget (516). For example, the provider element manager may find that the consumer is using only 20% of one service it bought, while using 90% of another service it bought. In that case, the provider element manager may reduce the allocation of the first service and use the corresponding released budget to increase the allocation of the second resource.

Upon completion or termination of the consumer service period, the provider element manager notifies the consumer element manager (518), which may proceed to shop for a new provider offering lowest cost services to meet the consumer's needs (520). The consumer element manager determines whether the price of the new provider found is lower than the price of the old provider (where the consumer resides at the time), or according to some embodiments, whether it is lower by a threshold amount (522). Assuming it is, the consumer element manager moves the consumer to the new provider, in which case it may also adjust the budget to reflect the price of moving, if any (524). Namely, according to various embodiments, a price of moving may be factored into the decision making process for whether the consumer should be moved to the new provider, and such price may be subtracted or deducted from the available budget. Otherwise, if the consumer element manager decides to keep the consumer with the old provider, it does not adjust the budget to reflect the price of moving. In either case, the provider element manager (of the new or old provider) checks to see if the consumer budget is sufficient to pay for the provider as described above.

According to various embodiments, the process of shopping for a new provider 520 may depend on specific characteristics of the consumer, resource or provider. For example, virtual machines 110 and 114 in FIG. 1 may need to exchange high-bandwidth, latency-sensitive communications through a congested switch 156. Further to the discussion above, internal I/O pathways (including either at server 102 or server 104) may offer higher bandwidth and lower latency, and thus result in improved performance. Therefore, according to various embodiments, such internal I/O pathways may be priced lower than I/O pathways involving, for example, multiple servers 102 and 104 and switch 156 or 158. As an example, in step 520 described above and shown in FIG. 5, it may be discovered that it would be more economical or efficient to move a consumer element from server 102 to server 104 because of reduced I/O pathway pricing. For example, it may be discovered that virtual machine 110 should be moved to server 104 to obtain one or more resources and communicate with one or more other elements located at server 104. This can be the case where, for example, it is determined at step 522 that the overall price of providing virtual machine 110 with necessary resources is reduced at least in part because of a lower price of the I/O pathway should virtual machine 110 be moved to server 104. In that case, at step 524, the virtual machine 110 may be moved to server 104 so that the I/O pathway becomes more (or entirely) local to server 104, thus benefiting from higher expected bandwidth capacity and lower latency. According to various embodiments, at step 524, the budget of the consumer element (e.g., virtual machine 110) may also be updated (e.g., increased or decreased) based at least in part in such change in pricing. As indicated above, in an alternative embodiment, the pricing of resources (e.g., associated with the I/O pathway) may be increased to account for performance improvement that would result from movement of a consumer element to another server and the resulting localization.

The order of steps in the example process 500 described above is illustrative only, and can be done in different orders. Moreover, it is contemplated that modifications and extensions of the process 500 will be used according to various embodiments. For example, a consumer may need to contract with two or more providers to be deployed, as in the case of a virtual machine that needs to acquire a bundle of resources offered by a server as well as SAN switch bandwidth and storage space at a storage array. In such scenarios, deployment of the consumer can be supported by extending step 502 to shop for multiple providers and then repeating the remaining steps for each of these providers. Additionally, for example, as explained below with respect to FIG. 6, the example process 500 shown in FIG. 5 may be modified or extended to enable the adjustment of resource allocations to obtain desired service level agreements (SLAs).

According to various embodiments, the above-described supply chain economic principles may also be used to manage software licenses, such as temporary (time-limited) software licenses. For example, regardless of type (such as authorizations of software use per user, per CPU, per server or per virtual machine), licenses may be modeled as resources to be purchased by an application manager 234, much like other resources that it may purchase from a virtual machine 212. License element managers (which, while not shown, may be included as part of platform layer 230) may be used to set the prices of the licenses based on costs and demands. In this manner, license management may be greatly simplified and unified with the allocation of other types of resources. For example, an application that is unable to acquire a needed license may suspend its operations and release its resources, as explained below, thus increasing the overall efficiency of the system. Additionally, licenses may be more efficiently used, since in situations where the licenses are highly utilized, they will be allocated to high priority tasks, while lower priority tasks may be suspended until they can afford the licenses. As soon as a license is no longer needed, it may be released and available for other tasks. Additionally, an administrator may consider the ROI of licenses, as with other resources, to plan the expansion, or contraction, of licenses capacity. For example, if a license's ROI is above a certain threshold, it may be desirable to acquire more licenses to increase the supply to meet demand.

Figure 6:
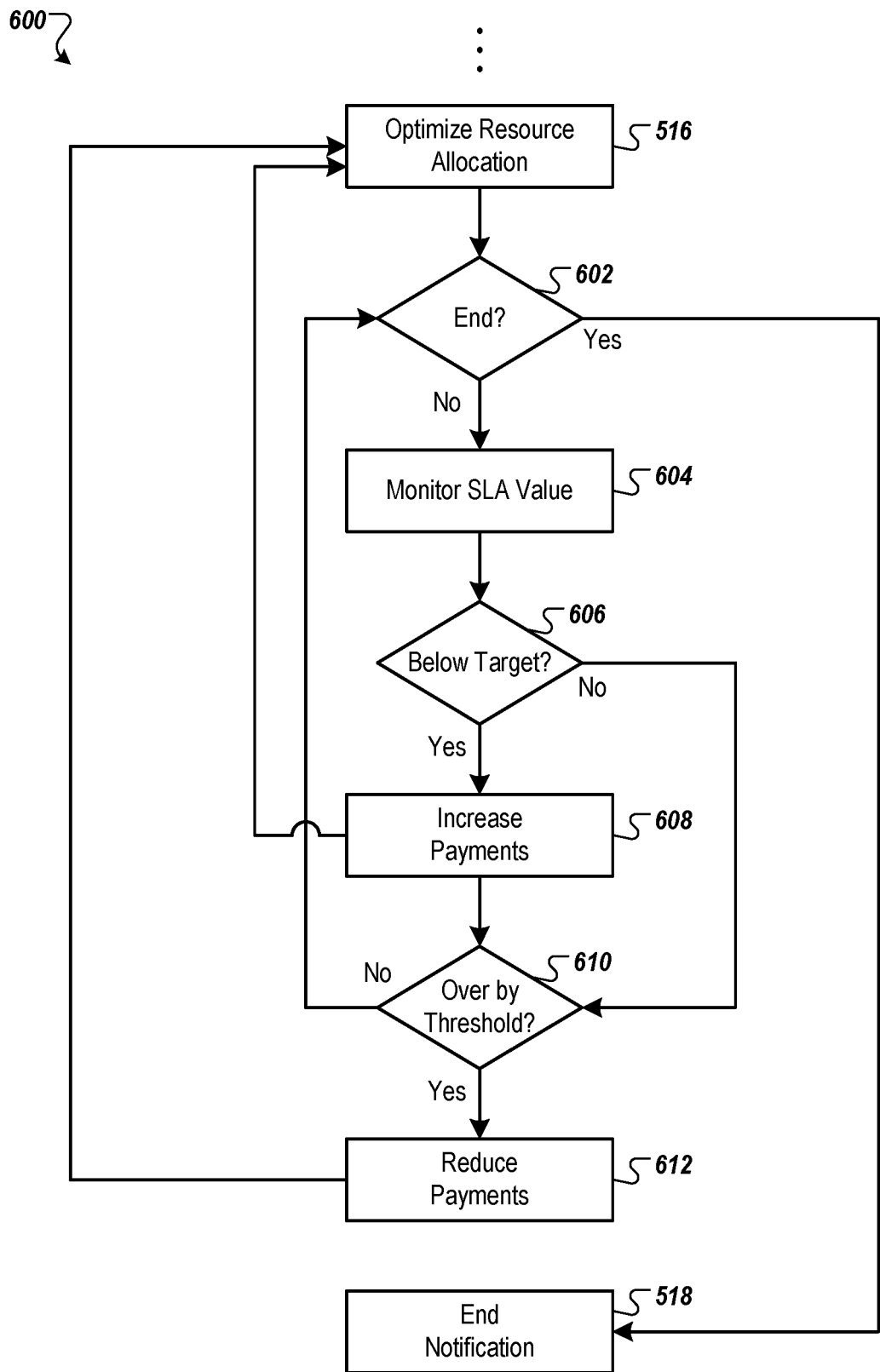
FIG. 6 is a flow diagram of an example process for delivering service level agreement targets through resource allocation in a virtualization system.

FIG. 6 is a flow diagram of an example process 600 for delivering service level agreement targets through resource allocation in a virtualization system, which includes many of the steps of process 500 shown in FIG. 5 and discussed above. Although not required, for the purpose of simplifying the following description, it is assumed that the target service level agreement relates to an application running on a virtual machine. However, the service level of other types of computer elements may be controlled in the following manner according to various embodiments.

Following the initial monitoring of resource utilization and optimizing of the virtual machine's budget (516), it is determined whether the consumer service period has terminated (602), in which case the provider element manager notifies the virtual machine element manager (518) as described above. Otherwise, the virtual machine element manager monitors and obtains the value of the SLA parameter of interest, such as the average transaction rate of an application, the average transaction delay of an application, the average communications latency of the application, or the number of transactions performed within a predetermined prior time period by an application (604). For example, an application element manager may monitor the value of the SLA parameter, through respective instrumentation, and inform the virtual machine element manager of the SLA parameter. The application may define its SLA goal as 100 transactions per second, in which case the SLA parameter of interest is transaction-rate. In general, because SLA parameters can be assumed to increase monotonically with the amount of resources allocated to an application, the management of SLAs may be accomplished as described herein by finding a budget and a respective resource allocation that will accomplish the target SLA value.

The virtual machine element manager determines whether the SLA parameter of interest is below a desired target (606), in which case, for example, the application's payments to the virtual machine (e.g., of virtual currency units) are increased such that the virtual machine's budget is increased, and it is able to purchase more resources to increase the SLA parameter of the application (608). After such an increase, the virtual machine's budget use is again monitored and optimized or improved as described above.

If the virtual machine element manager determines that the SLA parameter is at or above the desired target, it is determined whether the SLA parameter exceeds the desired target by more than an acceptable threshold (610), in which case the payments to the virtual manager are reduced, thus reducing the virtual machine's budget and the resources it buys, saving on applications costs, and keeping the SLA performance within a desired tolerance range (612). After such a reduction, the virtual machine's budget use is again monitored and optimized or improved as described above. If the SLA parameter is within the acceptable range, however, a reduction is not applied, and the process is repeated until it is determined that the consumer service period has been completed or terminated.

According to various embodiments, the process 600 for delivering service level agreement targets through resource allocation in a virtualization system may be modified, adapted and/or simplified for certain resources and SLA metrics (including metrics associated with vPOD virtual machines or applications). For example, in the case of allocation of I/O pathways to reduce or minimize latency, the process 600 may be modified as follows. The SLA parameter may be selected as the latency-hop-count, e.g., the number of physical switches traversed by an I/O pathway. For example, I/O pathways between elements located or resident at the same server, e.g., virtual machines 110 and 112 in FIG. 1, generally do not traverse any physical switch, and thus may be described as having a latency-hop-count of 0. Such I/O pathways may also be referred to as having Class-0 Latency SLA. On the other hand, I/O pathways between elements located or resident at different servers (e.g., virtual machines 110 and 114 in FIG. 1) and attached to a common switch (e.g., switch 156) may be described as having a latency-hop-count of 1, and may be referred to as having Class-1 Latency SLA. According to various embodiments, an I/O pathway may involve two or more physical switches, and may be described as having a latency-hop-count of 2 (or more) and referred to, for example, as having Class-2 Latency SLA.

According to various embodiments, the latency-hop-count associated SLA value may be described with respect to the ordinal preference {Class-0, Class-1, Class-2}, where Class-0 is preferred to Class-1, Class-1 is preferred to Class-2, and so on to the extent additional Classes are defined. With respect to the process described in connection with FIG. 6, at step 606, a comparison can be made between a Target Latency Class and the Actual Latency Class, e.g., Target=Class-0, Actual=Class-1. If the Actual Latency Class does not meet the Target, at step 608, payments to the consumer (e.g., virtual machine) may be increased and, following return to step 516, an I/O pathway can be acquired that can deliver the Target SLA Value, e.g., Class-0. For example, the process described with respect to FIG. 6 can be modified in a manner consistent with the above description so as to simplify the monitoring and control of SLA values to classification of the I/O pathway into latency class.

It will be understood that the SLA-delivery process 600 described above may be flexibly adapted to achieve various goals, such as improving its handling of stochastic fluctuations of an SLA parameter. For example, the steps of increasing (608) and decreasing (612) payments by the application to the virtual machine may use standard mechanisms of Stochastic Approximation theory, including the Robbins-Monro or Kiefer-Wolfowitz algorithms, to regulate the changes in payments to assure convergence. Such a design may be implemented, for example, to achieve more desirable results in connection with non-monotonic SLA parameters. For example, an embodiment using a Robbins-Monro procedure may replace steps 606-612 with the following iteration:

$$R(n+1) \leftarrow R(n)+a(n)[\text{SLATarget}-\text{SLAParameter}(R(n))]$$

where n is a counter of the iterations, R(n) is a vector describing the resource bundle allocated after n iterations, SLATarget is the desired value of the SLAParameter, and SLAParameter(R(n)) is the observed value of the SLAParameter after n iterations. The vector a(n) represents the increase/decrease of resources through the n-th step of the iteration; typically a(n)=a/n, where a is a fixed bundle.

Although SLA-delivery process 600 described above uses an economic model and virtual currency units to control SLA levels, other manners of controlling SLA levels may be used according to various embodiments. For example, the allocation of resources to a virtual machine, or to an application, may be independent of any economic budget or transfer of virtual currency units, and may instead be based on other measures of an application's or virtual machine's importance.

The process 500 described above may also be modified or extended according to various other embodiments. For example, since current hypervisors are not readily adaptable to handling the management of storage I/O through HBA or storage systems schedulers, as an alternative to an arbitrary first-come-first-serve process, process 500 described above may be modified or extended as shown in FIG. 7 to facilitate the handling of storage I/O.

Figure 7:
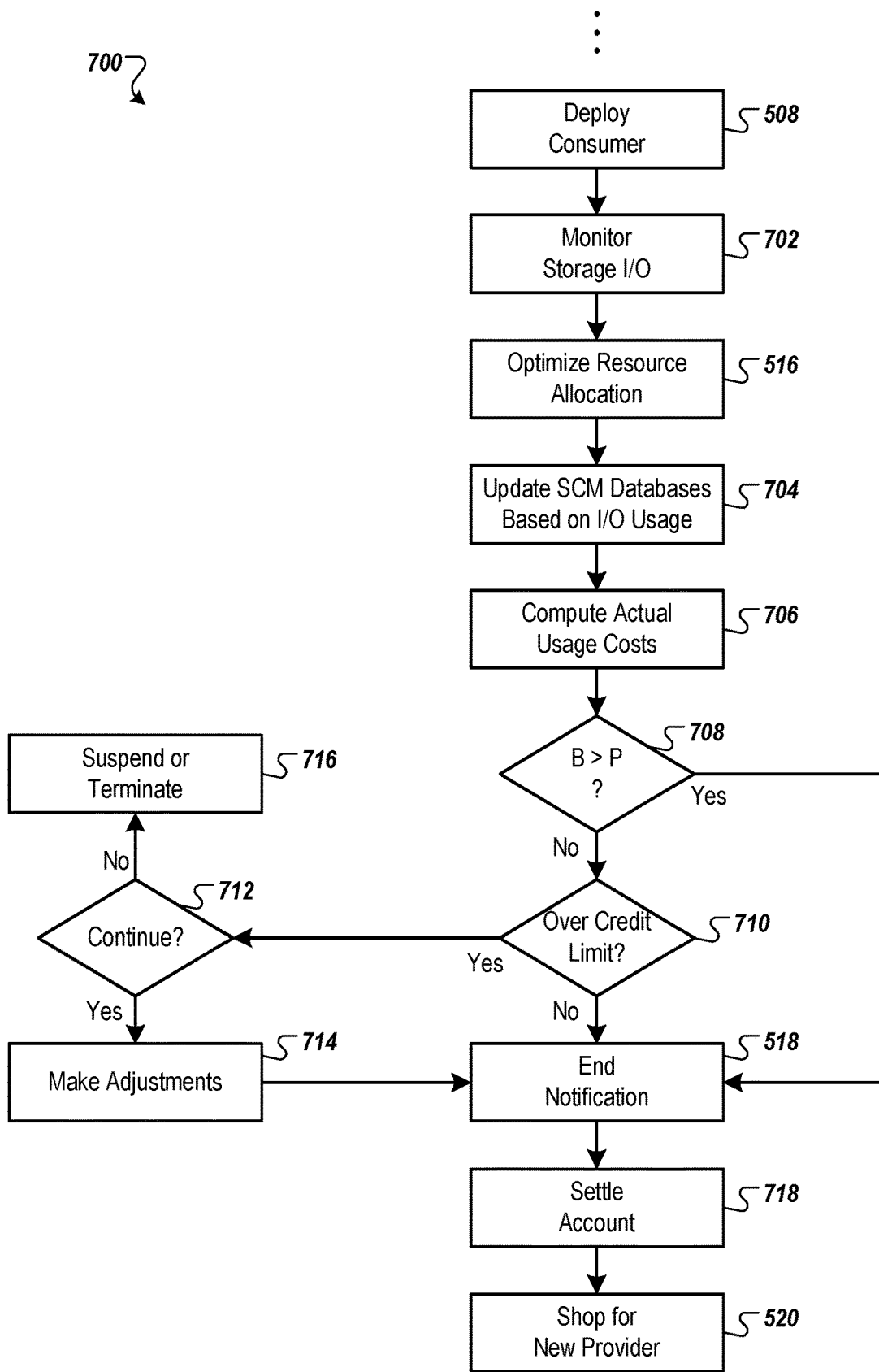
FIG. 7 is a flow diagram of an example process for economic-based I/O scheduling in a virtualization system.

FIG. 7 is a flow diagram of an example process 700 for economic-based I/O scheduling in a virtualization system, which includes many of the steps of process 500 shown in FIG. 5 and discussed above. Although not required, for the purpose of simplifying the following description, it is assumed that the consumer is a virtual machine, the provider is a server, and the resource is storage I/O. It will be understood that, according to alternative embodiments, the resource being managed may be other types of I/O, such as network I/O.

Following the deployment of the virtual machine at a server (508), the server element manager monitors storage I/O usage by one or more virtual machines, such as by collecting data from one or more of the hypervisor, the guest operating systems of the virtual machines, and the HBAs (702). According to various embodiments, the server element manager may be configured to prevent congestion along storage I/O pathways, as might occur in cases of usage levels approaching the capacity limits. For example, the server element manager may prevent congestion by using pricing functions as described below that increase prices dramatically when utilization approaches 50% of the capacity.

The server element manager optimizes or improves the resources allocated to virtual machines, as described above (516), such that virtual machines acquire a share of the storage I/O resources that is commensurate with and optimally reflects their budget. The server element manager then periodically estimates both the average storage I/O capacity used and the average available I/O capacity, and updates the respective attributes of the storage I/O objects in the above-described supply chain model databases 246 with this usage data (704). It is noted that the usage data reported to the supply chain model databases 246 will impact price computations, with excessive utilization of storage I/O capacity resulting in respective price increases, and higher prices in turn deflecting demand by new or existing virtual machines to servers with lower utilization (and prices) of storage I/O. For example, price competition over using storage I/O resources may result in migration of low budget virtual machines from overloaded servers to other servers where storage I/O resources are more highly available, and are thus priced lower. Higher priority virtual machines, on the other hand, may use their higher budgets or credit to obtain a preferential share of storage I/O resources.

The server element manager also computes the actual (versus projected) costs expended by each virtual machine, and applies these prices to handle its current commitments to virtual machines (706). For example, higher usage of storage I/O results in higher prices and immediate costs assigned to virtual machines, such that virtual machines of lower priority and high storage use requirements may quickly exhaust their budget or credit and be suspended or terminated, as described below. In this manner, the low priority virtual machines relinquish storage I/O capacity to virtual machines having a higher priority and thus higher budget.

Based on the computed costs, the server element manager evaluates whether the virtual machine's budget is sufficient to pay the cost (708). If it is, the service period of the virtual machine continues until it ends, and the server element manager notifies the virtual machine element manager of the completion of the service period (518).

Otherwise, if the virtual machine's budget is not sufficient, the server element manager evaluates whether the virtual machine's credit (costs minus budget) exceeds an acceptable credit threshold (710). According to various embodiments, high priority virtual machines may have higher budgets and credits and can thus afford to overpay the server element manager to guarantee that they do not run out of storage I/O resources. If it is determined that the virtual machine's credit excepts the threshold, the virtual machine element manager initiates a credit check process to decide whether the virtual machine can increase its budget or sufficiently lower its service demands, and thus continue to run (712). If possible, the virtual machine makes any necessary adjustments (such as a budget increase in the case of high priority virtual machines, or reduced service demands) and continues to run (714), until the service period has ended and the server element manager has notified the virtual machine manager of the termination of the service period as described above. Otherwise, the server element manager suspends or terminates the virtual machine execution and notifies the virtual machine element manager, which becomes responsible for addressing the suspension or termination (716).

Upon termination of the service period and notification to the virtual machine element manager, the server element manager reports usage data to the virtual machine element manager and settles any credit, overpayments or underpayments with the virtual machine element manager (718). The virtual machine element manager may then proceed to shop for a new server offering lowest cost services to meet the virtual machine's needs (520), as explained above.

The economic-based scheduling process 700 described above may be used effectively to de-correlate peaks of competing, bursty I/O flows. For example, consider the scenario of four virtual machines sharing a common server and a 4 Mbps Fiber Channel HBA, where the virtual machines generate average storage I/O flows of 250 Mbps, 250 Mbps, 200 Mbps and 300 Mbps, respectively. The aggregate demand average of 1 Gbps consumes only 25% of the HBA capacity. A resource scheduler may limit its consideration to only the average demand which, in this case, would be manageable by the HBA and SAN. However, consider an alternate scenario where the I/O traffic streams are bursty, with a peak/average ratio of five for each virtual machine. If the four I/O streams associated with the virtual machines are uncorrelated, their peaks will be likely dispersed and the peak of the aggregate stream will generally be less than 2 Gbps, which can be handled by the HBA and SAN with negligible or relatively few queuing delays. However, if the I/O streams are correlated, their peaks may be compounded to generate, for example, up to 5 Gbps peaks, utilizing 125% of the capacity and generating sustainable congestion, delays and losses. The scheduling process 700 described above reduces the likelihood of compounded peaks, since they result in peak prices and a corresponding depletion of budgets and credits of low budget virtual machines, leading to suspension, termination or migration of such virtual machines to servers with lower storage I/O prices until they find servers where their peaks are sufficiently de-correlated from other virtual machines.

Thus, the allocation of virtual machines to common servers according to scheduling process 700 may result in substantially de-correlated peaks and substantially reduce the peak/average ratio seen by servers. For example, consider the example of four virtual machines above. If their peaks are uncorrelated, the peaks of the aggregate stream will generally require at most 1.5 Gbps (the peak of the largest component stream), while their average traffic is 1 Gbps. The burstiness ratio (peak/average) of the aggregate stream 1.5/1=1.5 therefore represents only 30% of the burstiness of the individual streams (1.5 divided by 5). The economic-based scheduling process 700 described above substantially reduces interference not only between traffic averages, but it also reduces the interference between correlated traffic peaks. This results in smoother, less bursty, aggregate workloads, which may permit more efficient processing.

It will be understood that, according to various embodiments, the process 700 described above to manage storage I/O flows may applied to other forms of I/O, such as network I/O. For example, the above description should be understood to include alternative processes whereby references to "storage" are replaced by references to "network." It will similarly be understood that storage I/O flows typically utilize network-PO flows, such as Ethernet (e.g., FCOE), TCP/IP (e.g., NFS), and SAN (e.g., FC, iSCSI), to transfer information such as storage access commands. The scheduling process 700 is therefore independent of the specific underlying network, and of the specific access commands carried by the described flows. Accordingly, the process 700 may be applied to schedule network I/O flows and thereby provide similar or identical benefits to those associated with storage I/O flows, such as smoothing the peaks of bursty traffic and/or supporting priority services. In the case where process 700 is applied to network I/O, for example, step 702 in FIG. 7, which currently reads "Monitor Storage I/O," would be modified to apply to the monitoring of network I/O.

The order of steps described above with respect to scheduling process 700 is illustrative only, and can be done in different orders. Moreover, the aforementioned beneficial effects are true not only for I/O streams, but for workloads sharing other resources as well.

The contracting of services between a consumer and a provider, as described in the example processes above, may include the use of a standard request-response protocol (such as SOAP) to submit a purchase order to the provider and transfer a respective payment. In response, the provider may deploy the service requested by the consumer and respond with a service confirmation.

FIG. 8A is an example purchase order data structure 800 issued by a consumer element manager for use in purchasing services from a provider element manager. The first two fields of the data structure 800, source-ID field 802 and provider-ID field 804, respectively identify the source consumer and destination provider. The third field, transaction-ID field 806, identifies the particular purchase order. The fourth field of the data structure 800, service field 808, identifies the service and provides parameters to quantify the purchase. The fifth field of the data structure 800, payment field 810, provides payment data including payment amount and authentication data to establish the validity of the payment. Finally, the sixth field of the data structure 800, authentication field 812, provides data to authenticate the validity of the purchase order transaction.

FIG. 8B is an example service confirmation data structure 850 issued by the provider element manager for use in confirming or rejecting the purchase of services by the consumer element manager. The first three fields of the data structure 850, source-ID field 852, provider-ID field 854 and transaction-ID field 856, correspond to the first three fields of the data structure 800 described above. The fourth field of the data structure 850, service confirmation field 858, includes data to confirm the service and enable the source to access it. Alternatively, assuming the provider has rejected the transaction, the service confirmation field 858 would include data with the reason or reasons for rejection, such as insufficient resources or a price change. Finally, the fifth field of the data structure 850, authentication field 860, provides data to authenticate the validity of the service confirmation.

Figure 9:
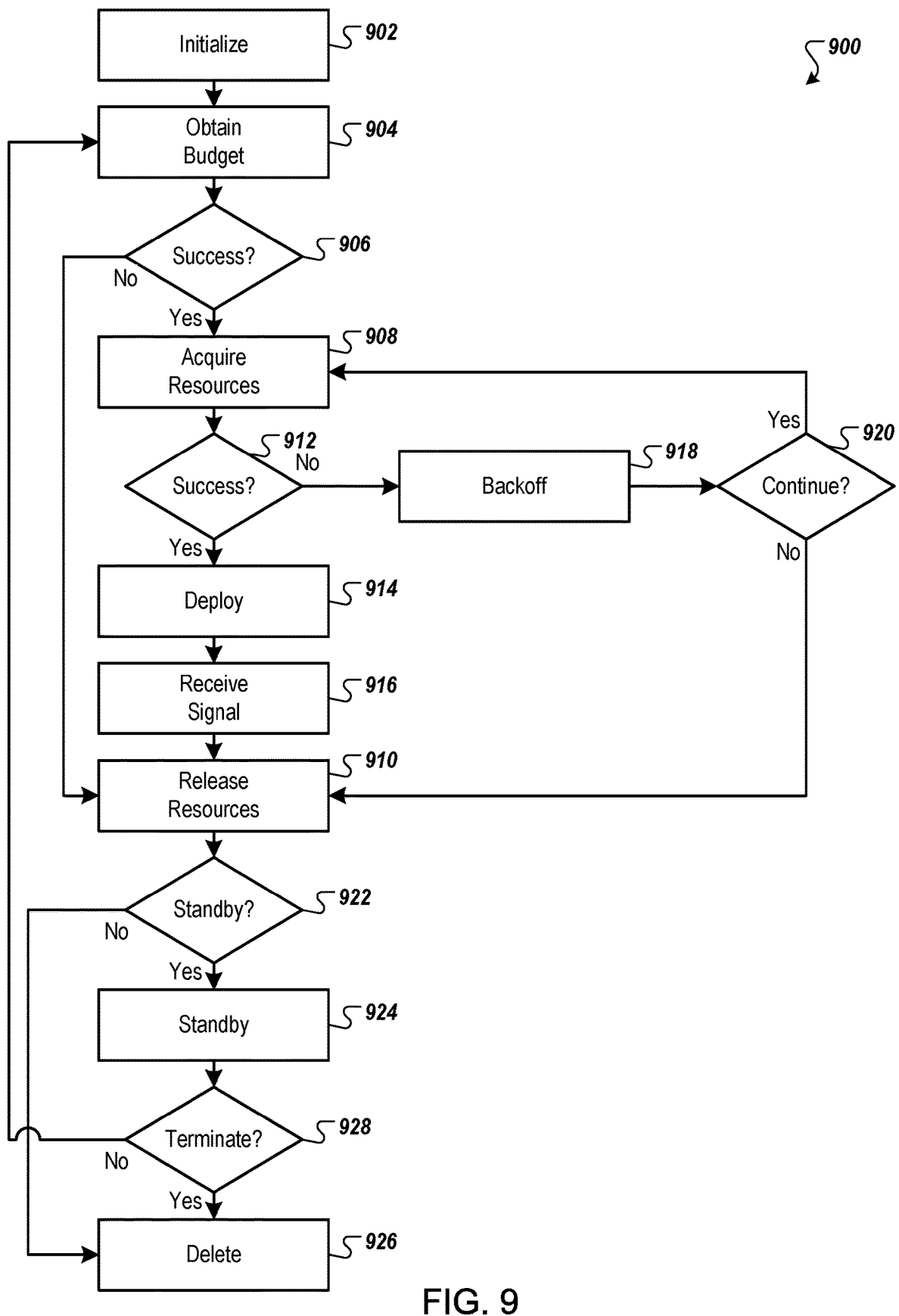
FIG. 9 is an example process for managing the states of system elements in a virtualization system.

As described below, various embodiments may also be used to address the problems of virtual machine sprawling and energy consumption in virtualization systems using supply chain economics. Regarding sprawling, as explained in greater detail below, these embodiments may be used to suspend or terminate virtual machines that are no longer needed or productive. These embodiments may also be used to terminate virtual machines, or to disallow their re-activation if in a standby state, that are determined to be inconsistent with the current versions of their guest operating system and applications. Regarding energy consumption, these embodiments may be used to consolidate and shift virtual machines into fewer servers, for example, while still providing desired SLA performance, and switching other unused or non-productive servers OFF or into standby mode to reduce energy use. The supply chain software model and processes described above provide mechanisms and metrics to quantify how productive or non-productive a service element is. The following description details an example process 900, shown in FIG. 9, for managing the states of virtualization system elements, which as explained further below, may be used to address sprawling and energy consumption issues. For simplicity, the following description assumes that the system element is a virtual machine, although the general principles that follow may be readily adapted for any type of system element.

A virtual machine is first initialized, for example, through the use of an initialize signal generated by a management station (902). Similarly, for example, an application element may interpret events generated by a launch as an initialize signal.

After being initialized, the virtual machine attempts to obtain an initial budget to acquire resources for its operations (904). It is next determined whether the virtual machine was successful in obtaining an initial budget (906), in which case it tries to acquire the resources needed to launch a respective service component (908). Otherwise, it begins the termination procedure by releasing any resources allocated to it (910).

If the virtual machine is successful at acquiring resources (912), it is provisioned, deployed, and remains in an active state (914) until it receives a signal to switch the service element OFF to an idle or standby state (916). After the terminate signal has been received, the virtual machine begins the termination procedure by releasing resources allocated to it, as described above.

On the other hand, if the virtual machine is not successful at acquiring resources, it will wait an amount of time for sufficient resources to become available before attempting to acquire resources again (918). For example, during this waiting period, the virtual machine may use an exponential "backoff" mechanism, whereby it repeats its attempts to acquire resources, but doubles the waiting period between repetitions with every failure. If it is determined that the virtual machine should continue to try to acquire resources (920), it will do so as described above. Otherwise, for example, if failures persist beyond some timeout period, the virtual machine abandons attempts to launch and begins to terminate.

Once resources have been released, it is determined whether the virtual machine should remain in a standby state (922), in which case the execution of the virtual machine stops, but it remains in a suspended or standby state and retains sufficient state data, for example, by using storage services to retain state data in image form, and for which the virtual machine may be required to pay (924). Otherwise, the virtual machine terminates execution and may be deleted (926).

According to various embodiments, the applications being executed by the virtual machine are first terminated, and the guest operating system of the virtual machine is then terminated, prior to such termination of the virtual machine. Such a graceful termination may be pursued through a recursive termination of the supply chain elements supported by the virtual machine. For example, a virtual machine element manager may issue a terminate signal to a corresponding operating system manager, which propagates the signal to an application manager, which in turn signals termination to is application. The application may then begin the termination steps as described above with respect to process 900, after which a termination complete signal to the application manager, and is forwarded to the operating system manager, which in turn sends a terminate signal and receives a termination complete signal back from the operating system. Finally, the operating system's termination complete signal may be forwarded to the virtual machine manage, which can signal the virtual machine to terminate. It will be understood that terminating (or even suspending) a virtual machine operations may result in damages if conducted improperly or at an inappropriate time. Thus, according to various embodiments, a notification procedure may be invoked to notify administrators of pending terminations or suspensions, such that termination or suspension may only be completed once administrator permission has been received.

For a virtual machine in standby state, it is determined whether termination should follow (such as by receipt of a terminate signal) (928), in which case the virtual machine terminates execution as described above. Otherwise, for example, if it is determined that the virtual machine should re-activate, the virtual machine seeks to obtain a budget to acquire resources for its operations as described above, for example, upon receiving an initialize signal. It will be understood that the specific actions described above in connection with process 900 may be modified for non-virtual machine system elements, and that the order of steps in process 900 are also illustrative only.

According to various embodiments, a process such as process 900 described above may be used to control virtual machine sprawling by suspending or terminating non-productive system elements, such as virtual machines. For example, consider the ROI of a virtual machine, which measures the relationship between the payments it collects from applications and the prices it pays for underlying server and I/O resources. If the virtual machine's ROI is greater than one, the virtual machine is earning more than it expends, and the virtual machine may be classified as being productive in creating applications value that exceeds the costs of the infrastructures it uses. However, if the virtual machine's ROI is less than one, this means that the virtual machine produces less value than the cost of resources it consumes, and the virtual machine may thus be classified as non-productive. In this manner, ROI is one example of a metric of productivity that may be used in determining whether a system element should be suspended or terminated, or whether it should remain active.

A process such as process 900 described above may be used to assure, for example, that applications' budgets are sufficient to keep one or more virtual machines' ROI greater than one, and to notify applications' administrators (element managers) as needed when budgets are low. It the ROI of one or more virtual machines remains less than one for more than a threshold period, for example, it may indicate that an application's budget is too low to sustain productive operation, and that the corresponding, non-productive virtual machine should be suspended or terminated. For example, a virtual machine may receive a terminate signal to switch it OFF to an idle or standby state (per step 916 of process 900 described above) as soon as the virtual machine's productivity level or score (for example, measured by its ROI) has been determined to be less than one for a predetermined time period. Additionally, for example, the length of time that the virtual machine's ROI has been less than one may be a factor in deciding whether the virtual machine should be terminated, or only suspended for the time being.

Similarly to dealing with the sprawling issue, process 900 described above and similar processes may also be used for energy management. For example, such processes may be used to suspend or terminate (switch OFF) servers that are classified as being non-productive, as in the case where a server's ROI is less than one for a sufficiently long period of time. In this case, the server element manager, much like the case of the virtual machine manager described above, can monitor the ROI and detect termination or suspension conditions. The server manager may then pursue a termination process, similar to the recursive termination process described above, where all virtual machines on the server are first terminated, or moved to another server, before the server manager suspends the server into Standby state (so as to consume less energy and cooling resources, for example) or switches the server OFF.

According to various embodiments, process 900 and similar processes may also be used to assure consistency of a suspended virtual machine with changes in its guest operating system or applications software. For example, the virtual machine manager may prevent such inconsistencies by sending a terminate signal, as described above, to all virtual machines whenever their respective operating system or applications software has changed, thus causing the applicable virtual machines to transition from standby to terminate state, at which point it may be deleted.

Figure 10:
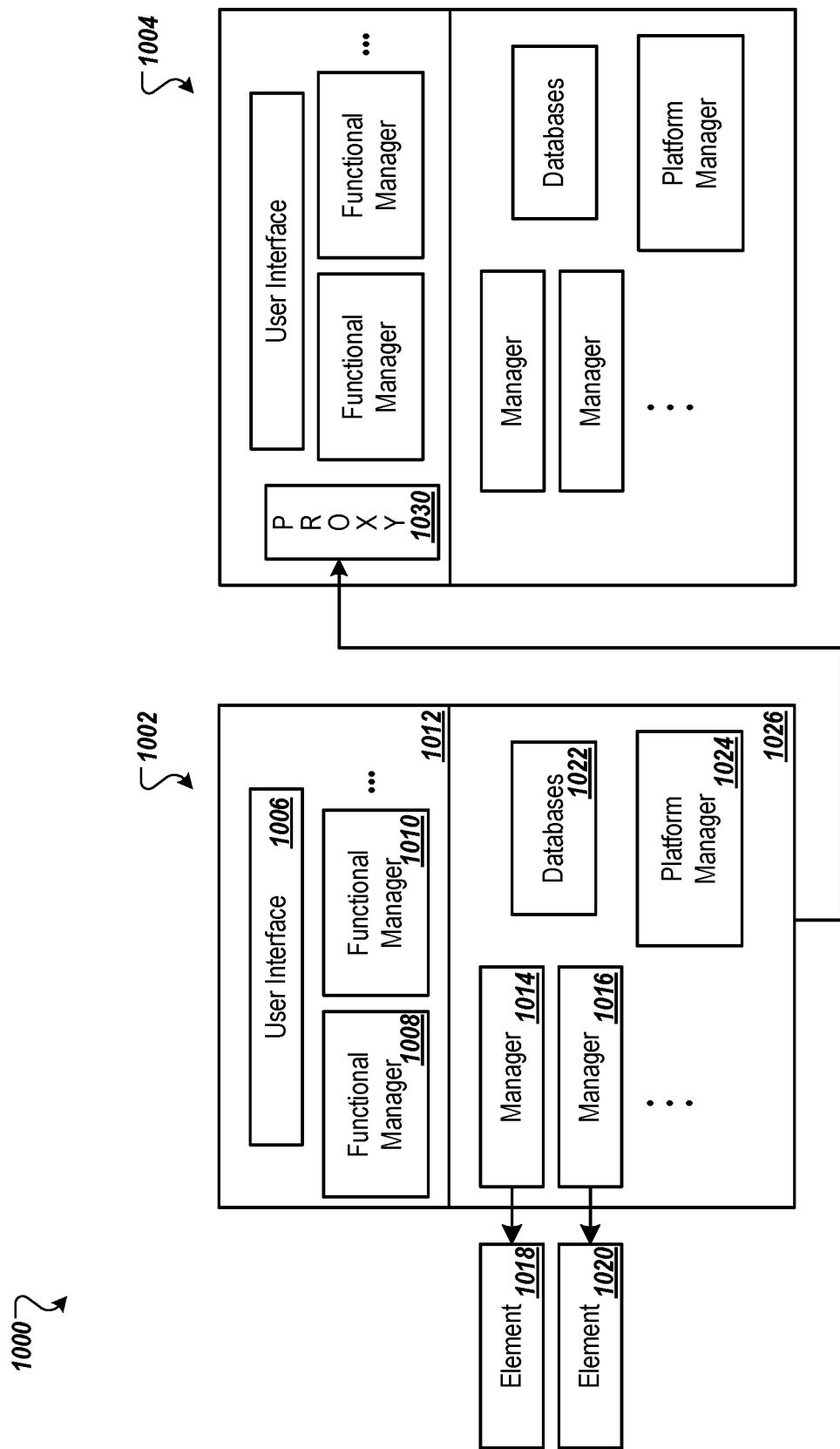
FIG. 10 is a block diagram of an example multi-domain software system environment for managing virtualized resources.

Although the above descriptions consider a single-domain virtualization environment, it will be understood that the principles described herein may also be applied to multi-domain environments. For example, FIG. 10 is a block diagram of an example multi-domain software system environment 1000 for managing virtualized resources in "multi-cloud" systems. Virtualization environment 1000 includes two example software systems 1002 and 1004, each of which is similar to the more detailed example software system 200 shown in FIG. 2, and which operate in a first and second domain, respectively.

As shown, software system 1002 operating in the first domain includes user interface subsystem 1006 and one or more functional managers 1008 and 1010. Together, these elements make up the functional management layer 1012 of software system 1002, and provide specific management applications as described above in connection with FIG. 2.

Software system 1002 also includes one or more element managers 1014 and 1016, which monitor and control one or more respective virtualization stack elements 1018 and 1020. Software system 1002 also includes one or more databases 1022 (such as the supply chain databases and operations databases described above), as well as a platform manager 1024. Together, these elements make up with platform layer 1026 of software system 1002, and provide the infrastructures to monitor the virtualization stack elements 1018 and 1020, model these elements as part of a supply chain economy, and control their operations, as described above.

Software system 1004 operating in the second domain includes similar elements as software system 1002, and also includes a proxy manager 1030. According to various embodiments, this second domain software system 1004 exports one or more resources or services to first domain software system 1002 by using the proxy manager 1030. The proxy manager 1030 exports instrumentation to monitor and control these provided resources to one or more of the element managers 1014 and 1016, such as virtual machine element managers, of the first domain software system 1002. The first domain software system 1002 may view the second domain software system 1004 as a service element integral with its supply chain model.

According to various embodiments, the second domain software system 1004 is in complete control of the resources (or services) and capabilities exported to the first domain software system 1002. For example, software system 1004 may be an external cloud provider exporting raw server services to software system 1002. In this case, software system 1002 can access these services, using its local element managers 1014 and 1016, to allocate, for example, CPU, memory and storage resources at the second domain software system 1004 and then monitor and control their use and operations.

Moreover, according to various embodiments, software systems 1002 and 1004 are separately owned and/or managed. For example, software system 1002 may be owned and operated by a small business that experiences steady computing needs except for two hours in each day, during which time its computing needs are consistently elevated. In this case, rather than purchasing permanent computing resources to handle the two hours of elevated needs per day, for example, software system 1002 may lease or purchase additional computing resources from software system 1004 (e.g., owned by Amazon.com, Inc.) on an as-needed basis. For example, computing resources from software system 1004 may be leased or purchased to facilitate the execution of a multi-tier web service by a cluster of virtual machines (or applications), such as using vPODs as discussed above. In that example, the software system 1002 may lease or sell resources from software system 1004 to execute this cluster of virtual machines (or applications) and then optionally migrate the virtual machine cluster (or application cluster). For example, the migration may take place from a private cloud of a small business to the public cloud of another business (e.g., of Amazon, Inc.). Additionally and alternatively, during peak-time of a private cloud, the migration can take place from a private cloud to a public cloud to avoid congestion of the private cloud. In some embodiments, using vPods to migrate from the private cloud to the public cloud provides high quality service while avoiding inefficiencies of over-provisioning the private cloud infrastructures. It is noted that, according to various embodiments, even if needed computing resources are available from within software system 1002, such resources may be purchased from software system 1004 based on relative price offerings.

In some embodiments, deploying, migrating, and/or terminating the virtual machine of a particular software system (e.g., software system 1004 in the preceding example) can result in not only resource interference, but also bandwidth insufficiency. Resource interference occurs, for example, as more than one vPOD is migrated to the same hardware cluster. Similarly, migrating virtual machines between public and private clouds individually may result in a situation where one virtual machine runs on a private cloud and another virtual machine runs on a public cloud. When these virtual machines are highly interactive with one another, the constant communication between the virtual machines can exceed bandwidth limitations for inter-cloud communications. This may lead to congestion, failures, and very high costs.

Accordingly, atomic vPOD migration provides for seamless (or at least simplified) transition of a selected software system. For example, an entire vPOD, including all virtual machines (or applications), configuration data, and so on of the vPOD can be migrated as a single atomic action, thereby avoiding (or at least reducing) such resource interference. In some embodiments, the migrated vPOD is only activated when all related virtual machines are fully available (for example, to minimize bandwidth insufficiency discussed above).

The asymmetric relationship between software systems 1002 and 1004 shown in FIG. 10 and described above may be extended to provide full symmetry. In that case, the first domain software system 1002 would incorporate its own proxy manager (not shown) to export services to the second domain software system 1004, which would integrate it within its supply chain through one or more of its respective element managers.

The use of supply chain economic principles and other principles explained above serve several purposes and provide several potential benefits, both expressly numerated and otherwise. For example, these principles can be used to provide a common software framework and abstractions to unify and automate the management of virtualization systems. More specifically, they can be used to optimize or improve the allocation of IT resources (such as I/O resources or software licenses) to best process applications workloads according to their business value. The principles of supply chain economics can also be used to balance workloads to minimize disruptive operating conditions, such as I/O congestion, and to reduce resource waste by terminating or switching-off underutilized resources. These principles can also be used to empower business units to monitor and control the delivery of SLAs to their applications, as well as the ROI of individual elements and the overall virtualization system. In addition, for example, these principles can be used to handle the management of virtual resources in a multi-cloud (or multi-domain) system.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer readable medium, such as a machine-readable storage device, a machine-readable storage substrate, a memory device, or a combination of one or more of them.

The terms "data processing apparatus" "data processor", or "processing device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a LAN and a wide area network ("WAN"), e.g., the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    allocating one or more respective computer resources from a first computer server to a first and second virtual machine operating in a virtualization system, wherein each virtual machine is a software implementation of a computer that runs at least one guest operating system and executes one or more programs or applications on the guest operating system and the first and second virtual machines have correlated peaks of input-output (I/O) flows;
    comparing target and actual I/O performance metrics associated with the first virtual machine;
    initiating at least one of a suspension sequence or a termination sequence for the first virtual machine on the first computer server based at least in part on the comparison of target and actual I/O performance metrics; and
    upon initiation of at least one of the suspension sequence or the termination sequence for the first virtual machine, automatically initiating at least one of a suspension sequence or a termination sequence for the second virtual machine on the first computer server based at least in part on the initiation of at least one of the suspension sequence or the termination sequence for the first virtual machine so as to de-correlate the peaks of I/O flows associated with the first and second virtual machines.

2. The computer-implemented method of claim 1, wherein initiating at least one of the suspension sequence or the termination sequence for the first virtual machine is based at least in part on a determination that the first virtual machine is to be moved to a second computer server, different from the first computer server.

3. The computer-implemented method of claim 2, further comprising initiating a migration of the first virtual machine from the first computer server in which the first virtual machine is located to the second computer server.

4. The computer-implemented method of claim 2, wherein automatically initiating at least one of the suspension sequence or the termination sequence for the second virtual machine is based at least in part on a determination that the second virtual machine is to be moved to the second computer server.

5. The computer-implemented method of claim 4, further comprising initiating a migration of the second virtual machine from the first computer server in which the second virtual machine is located to the second computer server.

6. A computer system configured to perform operations comprising:
    allocating one or more respective computer resources from a first computer server to a first and second virtual machine operating in a virtualization system, wherein each virtual machine is a software implementation of a computer that runs at least one guest operating system and executes one or more programs or applications on the guest operating system and the first and second virtual machines have correlated peaks of input-output (I/O) flows;
    comparing target and actual I/O performance metrics associated with the first virtual machine;
    initiating at least one of a suspension sequence or a termination sequence for the first virtual machine on the first computer server based at least in part on the comparison of target and actual I/O performance metrics; and
    upon initiation of at least one of the suspension sequence or the termination sequence for the first virtual machine, automatically initiating at least one of a suspension sequence or a termination sequence for the second virtual machine on the first computer server based at least in part on the initiation of at least one of the suspension sequence or the termination sequence for the first virtual machine so as to de-correlate the peaks of I/O flows associated with the first and second virtual machines.

7. The computer-implemented method of claim 2, wherein automatically initiating at least one of the suspension sequence or the termination sequence for the second virtual machine is based at least in part on a determination that the second virtual machine is to be moved to a third computer server, different from the first and second computer servers.

8. The computer system of claim 6, wherein initiating at least one of the suspension sequence or the termination sequence for the first virtual machine is based at least in part on a determination that the first virtual machine is to be moved to a second computer server, different from the first computer server.

9. The computer system of claim 8, wherein the operations further comprise initiating a migration of the first virtual machine from the first computer server in which the first virtual machine is located to the second computer server.

10. The computer system of claim 8, wherein automatically initiating at least one of the suspension sequence or the termination sequence for the second virtual machine is based at least in part on a determination that the second virtual machine is to be moved to the second computer server.

11. The computer system of claim 10, wherein the operations further comprise initiating a migration of the second virtual machine from the first computer server in which the second virtual machine is located to the second computer server.

12. The computer system of claim 8, wherein automatically initiating at least one of the suspension sequence or the termination sequence for the second virtual machine is based at least in part on a determination that the second virtual machine is to be moved to a third second computer server, different from the first and second servers.

* * * * *